United States Patent
Iliopoulos et al.

(10) Patent No.: US 8,600,147 B2
(45) Date of Patent: Dec. 3, 2013

(54) SYSTEM AND METHOD FOR REMOTE MEASUREMENT OF DISPLACEMENT AND STRAIN FIELDS

(75) Inventors: Athanasions Iliopoulos, Chevy Chase, MD (US); John G. Michopoulos, Washington, DC (US); Nikos Andrianopoulos, Athens (GR)

(73) Assignee: The United States of America as represented by the Secreatary of the Navy, Washington, DC (US)

( * ) Notice: Subject to any disclaimer, the term of this patent is extended or adjusted under 35 U.S.C. 154(b) by 689 days.

(21) Appl. No.: 12/793,594

(22) Filed: Jun. 3, 2010

(65) Prior Publication Data
US 2010/0310128 A1 Dec. 9, 2010

Related U.S. Application Data

(60) Provisional application No. 61/183,644, filed on Jun. 3, 2009.

(51) Int. Cl.
| G06K 9/00 | (2006.01) |
| G06K 9/46 | (2006.01) |
| G01B 5/004 | (2006.01) |
| G01B 5/30 | (2006.01) |
| G01B 11/16 | (2006.01) |

(52) U.S. Cl.
USPC ........... 382/141; 382/108; 382/111; 382/181; 382/201; 382/203; 73/760; 73/748; 73/800; 356/32; 356/36

(58) Field of Classification Search
USPC ......... 382/141, 108, 111, 181, 201, 203, 103; 73/760, 784, 800; 356/32, 36
See application file for complete search history.

(56) References Cited

U.S. PATENT DOCUMENTS 4,288,852 A * 9/1981 Holland .................. 382/152
4,432,239 A   2/1984 Bykov
(Continued)

FOREIGN PATENT DOCUMENTS

EP   356727 A2 *  3/1990

OTHER PUBLICATIONS

Andrianopoulos. "Full-Field Displacement Measurement of a Speckle Grid by using a Mesh-Free Deformation Function." Strain. 42.4 (2006): 265-271. Print.*

(Continued)

*Primary Examiner* — Michael A Newman
(74) *Attorney, Agent, or Firm* — US Naval Research Laboratory; Sally A. Ferrett

(57) ABSTRACT

A computer-implemented method for measuring full field deformation characteristics of a deformable body. The method includes determining optical setup design parameters for measuring displacement and strain fields, and generating and applying a dot pattern on a planar side of a deformable body. A sequence of images of the dot pattern is acquired before and after deformation of the body. Irregular objects are eliminated from the images based on dot light intensity threshold and the object area or another geometrical cutoff criterion. The characteristic points of the dots are determined, and the characteristic points are matched between two or more of the sequential images. The displacement vector of the characteristic points is found, and mesh free or other techniques are used to estimate the full field displacement based on the displacement vector of the characteristic points. Strain tensor or other displacement-derived quantities can also be estimated using mesh-free or other analysis techniques.

17 Claims, 16 Drawing Sheets

(56) References Cited

U.S. PATENT DOCUMENTS

| | | | |
|---|---|---|---|
| 4,474,466 | A | 10/1984 | McDonach et al. |
| 4,765,189 | A | 8/1988 | Preater |
| 4,872,751 | A | 10/1989 | Hercher |
| 4,967,093 | A | 10/1990 | Takemori |
| 5,166,742 | A | 11/1992 | Kobayashi et al. |
| 5,539,656 | A * | 7/1996 | Annigeri et al. ............... 702/35 |
| 5,726,907 | A * | 3/1998 | Davidson et al. .............. 702/42 |
| 6,097,477 | A | 8/2000 | Sarrafzadeh-Khoee |
| 6,563,129 | B1 | 5/2003 | Knobel |
| 6,934,013 | B2 * | 8/2005 | Vachon et al. .................. 356/32 |
| 7,110,604 | B2 * | 9/2006 | Olsson .......................... 382/224 |
| 7,377,181 | B2 | 5/2008 | Christ, Jr. et al. |
| 2006/0229744 | A1 * | 10/2006 | Patzwald et al. ............... 700/59 |
| 2009/0220143 | A1 * | 9/2009 | Fournier ....................... 382/154 |

OTHER PUBLICATIONS

Clocksin, et al. "Image Processing Issues in Digital Strain Mapping." SPIE Proceedings, Applications of Digital Image Processing XXV. 4790. (2002): 384-395. Print.*

Andrianopoulos, "Full-Field Displacement Measurement of a Speckle Grid by using a Mesh-Free Deformation Function." Strain. 42.4 (2006): 265-271. Print.*

Lecompte, et al. "Analysis of Speckle Patterns for Deformation Measurements by Digital Image Correlation." SPIE Proceedings. 6341. (2006): 1-6. Print.*

Andersen, K.; Helsch, R., "Calculation of grating coordinates using correlation filter techniques", Optik, vol. 80, pp. 76-79, (1988).

Andrianopoulos, N. P., "Full-field displacement measurement of a speckle grid by using a mesh-free deformation function", Strain, vol. 42, 265-271, (2006).

Badaliance R. et al., "Effects of Computational Technology on Composite Materials Research: The Case of Dissipated Energy Density", presented at the First Hellenic Conference on Composite Materials Research, Xanthi, Greece, Jul. 2-5, 1997, pp. 1-39.

Belytschko, T.; Krongauz, Y.; and Organ, D. , "Meshless method: an overview and recent development,"Computer Methods in Applied Mechanics and Engineering, vol. 139, pp. 3-47, 1996.

Belytschko, T.; Lu, Y.Y.; Gu, L., "Element-free Galerkin methods", International Journal of Numerical Methods in Engineering, vol. 3, pp. 229-256, (1994).

Bruck, H.A.; McNeil, S.R.; Sutton, M.A.; and Peters, W.H., "Digital image correlation using Newton-Raphson method of partial differential correction", Expt. Mech., vol. 28, pp. 261-267 (1989).

Bruneel, H.C.J., "Intrinsic Errors on Sheet Strain Measurements Based on a Printed Square Grid", J. Manuf. Sci. Eng., vol. 122, pp. 760-765, (2000).

Cheng, P.; Sutton, M.A.,; Schreier, H.W.; McNeill, S.R., "Full-field speckle pattern image correlation with BSpline deformation function", Expt. Mech., vol. 42, pp. 344-352, (2002).

Iliopoulos, A.P.; Michopoulos, J.G.; Andrianopoulos, N.P., "Performance Sensitivity Analysis of the Mesh-Free Random Grid Method for Whole Field Strain Measurements", Proc. ASME 2008 International Design Engr. Tech. Conferences and Computers and Information in Engineering Conference IDETC/CIE 2008, DETC2008/CIE49732, Aug. 3-6, 2008, pp. 1-11.

Iliopoulos, A.P.; Michopoulos, J.G., "Effects of Anisotropy on the Performance Sensitivity of the mesh-free Random Grid Method for Whole Field Strain Measurement", Proc. ASME International Design Engr. Tech. Conferences and Computers and Information in Engineering Conference IDETC/CIE 2009, DETC2009/CIE-86962, Aug. 30-Sep. 2, 2009, pp. 1-10, (Aug. 2009).

Iliopoulos, A.P.; Andrianopoulos, N.P., "An Approach to Analyze Errors Introduced in the Random Grid Strain Measurement Method", Strain, vol. 46, pp. 258-266, Jun. 2010 (published online Nov. 2008).

Lancaster, P.; Salkauskas, K.; "Surfaces Generated by Moving Least Squares Methods", Mathematics of Computation, vol. 37, No. 155, pp. 141-158, (Jul. 1981).

Liu, G. R. and Gu, Y. T., "A Local Radial Point Interpolation Method (LRPIM) for Free Vibration Analyses of 2-D Solids", Journal of Sound and Vibration, vol. 246, No. 1, pp. 29-46 (2001).

Liu, G.R. and Gu, Y.T., "A point interpolation method for two-dimensional solids", Int. J. Numer. Meth. Engng., vol. 50, pp. 937-951, (2001).

Liu, W.K.; Jun, S.; and Zhang, Y.F., "Reproducing Kernel Particle Methods", International Journal for Numerical Methods in Fluids, vol. 20, pp. 1081-1106, 1995.

Michopoulos, J.M.; Hermanson, J.C.; Iliopoulos, A., "Toward a Recursive Hexapod for the Multidimensional Mechanical Testing of Composites", Proceedings of the ASME 2010 International Design Engineering Technical Conferences & Computers and Information in Engineering Conference IDETC/CIE 2010, DETC2010-28699, Aug. 15-18, 2010, pp. 1-9, (Aug. 2010).

Michopoulos, J.M., et al., "Towards the robotic characterization of the constitutive response of composite materials", Composite Structures, vol. 86, pp. 154-164, 2008, (available online Mar. 13, 2008).

Michopoulos, J.G.; Iliopoulos, A.P., "A computational workbench for remote full field 2D displacement and strain measurements", Proc. 2009 ASME Int. Design Engr. Technical Conferences and Computers and Information in Engineering Conference IDETC/CIE 2009, DETC2009/CIE-86900, pp. 1-9, Aug. 30-Sep. 2, 2009, (Aug. 2009).

Michopoulos, J.G.; Iliopoulos, A.P.; Furukawa, T., "Accuracy of Inverse Composite Laminate Characterization via the Mesh Free Random Grid Method", Proc. ASME International Design Engr. Tech. Conferences and Computers and Information in Engineering Conference IDETC/CIE 2009, DETC2009/CIE-87096, Aug. 30-Sep. 2, 2009, pp. 1-8, (Aug. 2009).

Parks, V. J., "Strain measurements using grids", Opt. Eng., vol. 21, pp. 633-639 (1982).

Peters, W.H.; Ranson, W.F., "Digital imaging techniques in experimental stress analysis", Opt. Eng., vol. 21, pp. 427-432, (1982).

Schreier, H.W.; Sutton, M.A., "Systematic errors in digital image correlation due to undermatched subset shape functions", Expt. Mech., vol. 42, pp. 303-310, (2002).

Sevenhuijsen, P.J., "Two simple methods for deformation demonstration and measurement", Strain, vol. 17, pp. 20-24 (1981).

Sevenhuijsen, P.J., "The Photonical, Pure Grid Method", Optics and Lasers in Engineering, vol. 18, pp. 173-194, (1993).

Sirkis, J.S., "System response to automated grid methods", Opt. Eng., vol. 29, 1485-93, (1990).

Sirkis, J.S.; and Lim, T.J., "Displacement and Strain Measurement with Automated Grid Methods", Experimental Mechanics, V. 31, No. 4, pp. 382-388, Dec. 1991.

* cited by examiner

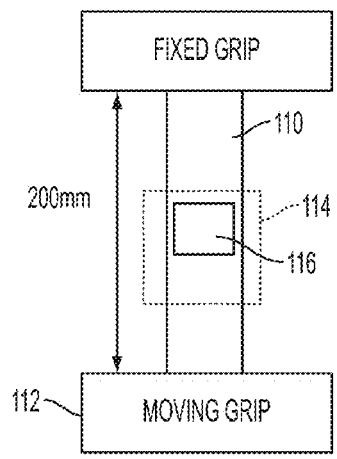
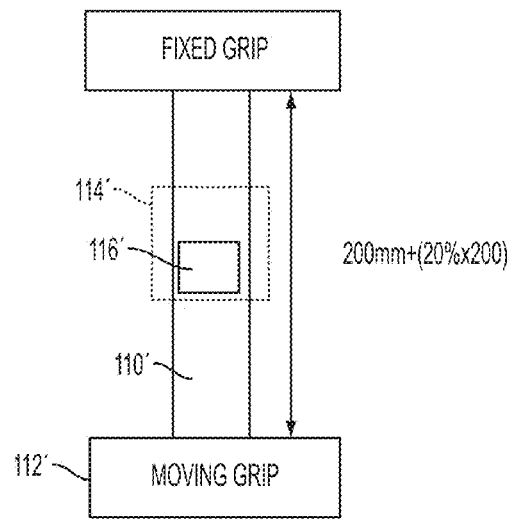
FIG. 11A
FIG. 11B
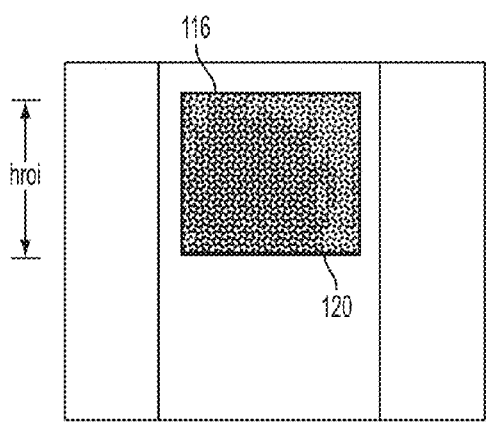
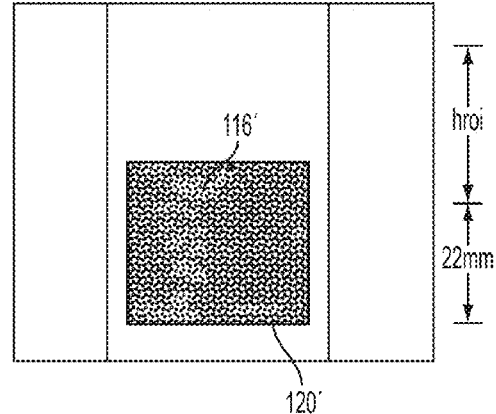
FIG. 11C
FIG. 11D

SYSTEM AND METHOD FOR REMOTE MEASUREMENT OF DISPLACEMENT AND STRAIN FIELDS

CROSS-REFERENCE TO RELATED APPLICATIONS

This Application claims the benefit of U.S. Provisional Application 61/183,644 filed on Jun. 3, 2009, the entire disclosure of which is incorporated by reference herein.

BACKGROUND

1. Technical Field

The present invention relates generally to a system for measuring and visualizing the full field of deformation behavior of a body in terms of displacement and strain, and more specifically, to methodology, algorithms and a corresponding set of tools for the data acquisition, digital image processing, field variable approximation or interpolation and visualization of digital images of a deforming body.

2. Background Technology

Beginning in the 1980's, digital imaging has been used to measure the deformation state of deformable material specimen. These displacement measurement methods have gained significant attention the last two decades, because of the great impact of digital imaging evolution. Modern digital cameras provide a cost effective and highly reliable tool for recording and processing images of an experiment using a personal computer. Experimental mechanics have greatly benefited from those capabilities and some methods have been developed for the determination of displacement and strain fields.

Both pure grid methods and digital image correlation methods have been proposed for providing full-field measurements of displacement and strain.

In pure grid methods, a uniform grid is applied to the surface of a specimen, and the measurement of deformation relies on the motion of the grid. These methods rely on specialized methods for application of the uniform grid. It can be difficult to apply a uniform grid to irregularly shaped bodies, and any inaccuracies in the application of the grid are a major source of errors in the measurement of deformation.

Pure grid methods are described in Sevenhuijsen, P. J., "Two simple methods for deformation demonstration and measurement", Strain, Vol. 17, pp. 20-24 (1981); Parks, V. J., "Strain measurements using grids", Opt. Eng., Vol. 21, pp. 633-639 (1982); Sevenhuijsen, P. J., "Photonics for deformations", Proc 5th Int. Congr. On Expt. Mechanics, SESA, Montreal, (June 1984); and Sevenhuijsen, P. J., "The Photonical, Pure Grid Method", Optics and Lasers in Engineering, Vol. 18, pp. 173-194, (1993).

Digital image correlation methods are described in Peters, W.H., Ranson, W.F., "Digital imaging techniques in experimental stress analysis", Opt. Eng. Vol. 21, pp. 427-432, (1982); Bruck, H.A., McNeil, S.R., Sutton, M.A., and Peters W.H., "Digital image correlation using Newton - Raphson method of partial differential correction", Expt. Mech. Vol. 28, pp. 261-267 (1989); and Cheng, P., Sutton, M.A., Schreier, H.W., McNeill, S.R., "Full-field speckle pattern image correlation with B-Spline deformation function", Expt. Mech., Vol. 42, pp. 344-352, (2002).

The performance of methods based on Digital image correlation, which rely on an applied speckle pattern, can be highly sensitive to the application method and on the specimen surface. Schreier, H. W. Sutton, M. A., "Systematic errors in digital image correlation due to undermatched subset shape functions", Expt. Mech., Vol. 42, pp. 303-310, (2002) discusses the sensitivity of the method to very specific qualitative and quantitative characteristics of the speckle pattern.

Additional grid-based methods are described in Sirkis, J. S., "System response to automated grid methods", Opt. Eng., Vol. 29, 1485-93, (1990) and Andersen, K., Helsch, R., "Calculation of grating coordinates using correlation filter techniques", Optik, Vol. 80, pp. 76-79, (1988). U.S. Pat. No. 7,377,181 to Christ, Jr. et al. discloses the use of coded marks.

Bremand, F. and Lagarde, A., "Two methods of large and small strain measurement on a small size area", Proc. SEM Spring Conf. On Expt. Mechanics, Keystone, Colo., USA, pp. 173-176, (1986) discloses a method of applying a Fourier transform of the grid pattern.

Mesh-free methods are described in Andrianopoulos, N. P., "Full-field displacement measurement of a speckle grid by using a mesh-free deformation function", Strain, Vol. 42, 265-271, (2006), in Andrianopoulos, N. P. and Iliopoulos, A. P. "Displacements Measurement in Irregularly Bounded Plates Using Mesh Free Methods", 16th European Conference of Fracture, Alexandroupolis, Greece, Jul. 3-7, 2006.

Random-grid mesh-free techniques are disclosed in Andrianopoulos, N. P. and Iliopoulos, A. P., "Strain measurements by a hybrid experimental-numerical method using a mesh-free field function", Honorary Volume for Professor P. S. Theocaris, Armenian Academy of Sciences, 31-41, (2005) and in Iliopoulos, A. P., Andrianopoulos, N. P., "An Approach to Analyze Errors Introduced in the Random Grid Strain Measurement Method", Strain, Vol. 46, pp. 258-266, June 2010 (published online November 2008).

Other methods for measuring deformation and strain use laser beams to illuminate the component. These methods typically require application of a special photosensitive film and can require darkrooms or other special test conditions.

SUMMARY

An aspect of the invention is directed to a computer-implemented method for measuring full field deformation characteristics of a body, including determining optical setup design parameters for measuring displacement and strain fields, applying a dot pattern on a planar side of a deformable body, acquiring a sequence of images of the dot pattern before and after deformation of the body, identifying the characteristic points of the dots with a computer processor, eliminating irregular objects from the sequence of images, matching the characteristic points between two or more subsequent images, calculating the displacement vector of the characteristic points, and calculating full field displacement based on the displacement vector of the characteristic points.

The method can also include calculating a full field strain tensor based on the displacement vector of the characteristic points. The full field displacement and strain is calculated by a mesh free approximation.

The method can also include acquiring a sequence of images includes digitally photographing the planar side of the deformable body during deformation, or extracting frames from a video imagery of the deformable body. The method can also include identifying and specifying photographic apparatus for acquiring the images.

The characteristic points can be centroids, and the step of identifying the characteristic points of the dots can be accomplished by light integration of the image to find the centroid of each dot.

The step of eliminating irregular objects from the sequence of images includes eliminating objects with a dot intensity below a threshold value and eliminating objects with a pixel area outside a predetermined range, or based on an object's aspect ratio, moment of inertia, major axes direction, or compactness ratio.

An aspect of the invention is directed to a computer-implemented method for measuring full field deformation characteristics of a deformable body, the deformable body having a surface to which a pattern of dots has been applied. The method includes receiving at least two sequential images of the pattern of dots on the surface acquired before and after deformation of the body, identifying the characteristic points of the dots with a computer processor, eliminating irregular objects from the sequence of images, matching the characteristic points between two or more subsequent images, calculating the displacement vector of the characteristic points, and calculating full field displacement based on the displacement vector of the characteristic points. The full field displacement can be calculated by a mesh free approximation. The method can include calculating a full field strain tensor based on the displacement vector of the characteristic points. The full field displacement and strain can be calculated by a mesh free approximation.

The method can also include controlling the identification of characteristic points by choosing appropriate light intensity, area and geometric characteristics of adjacent pixel locations. The method can also include receiving performance characteristics from a user, and selecting mesh free approximation parameters based on the performance characteristics. The method can also include receiving from a user directions to use a particular method for matching characteristic points between subsequent images. The method can also include displaying and storing the acquired images, user input, and calculated displacement and strain components. The method can also include displaying displacement, elongation, or strain as a function of time or image frames.

The dot pattern can be applied with mean dot distance of at least 2.1 times the mean dot radius. The dots can be applied so as to not overlap. At least one of the dot size, shape, or spacing is not uniform.

An aspect of the invention is directed to a method for measuring displacement characteristics of a surface having optically distinguishable marks thereon. The method includes receiving at least two sequential images of the marks on the surface acquired before and after deformation of the body, filtering non-markers from the sequential images based on a pixel threshold and a mark size cutoff limit, identifying the characteristic points of the distinguishable marks with a computer processor, matching the characteristic points between the sequential images after said non-markers have been eliminated, calculating the displacement vector of the characteristic points, and calculating full field displacement based on the displacement vector of the characteristic points. The images can be aerial images of the earth and said distinguishable marks are natural formations, buildings, or other man-made objects.

Aspects of the invention are also directed to computer readable media containing programmed instructions for accomplishing some or all portions of these methods.

Further features and advantages of the present invention will be set forth in, or apparent from, the following drawings and detailed description.

BRIEF DESCRIPTION OF THE DRAWINGS

FIGS. 11A and 11B show an experimental set up with a load tester and specimen.

FIGS. 11C and 11D illustrate the specimen's region of interest corresponding to FIGS. 11A and 11B, respectively.

DETAILED DESCRIPTION

The following detailed description describes a set of data and image acquisition utilities, image processing operations, pattern matching algorithms, data fitting procedures, as well as techniques for visualization and storage of images, field data, strain and displacement fields, and the history of displacement, strain and deformation data. These can be implemented by pure hardware, pure software, or combination of both.

Figure 1:
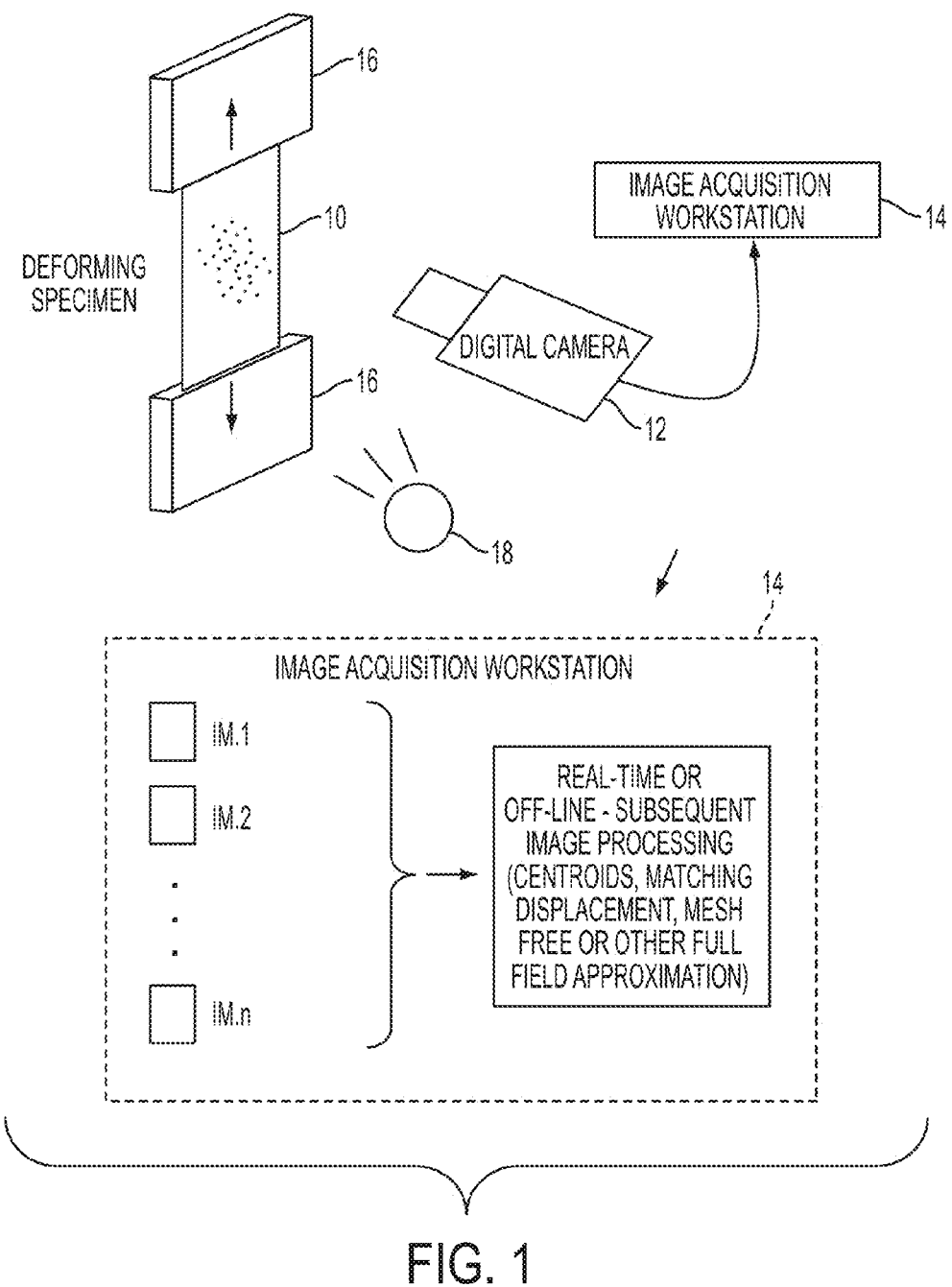
FIG. 1 illustrates a testing system for implementing the method of determining full field displacement and strain.

FIG. 1 shows a system for measuring deformations, including a digital camera 12, a specimen 10 under load by a loading apparatus 16, and a computer 14 programmed with instructions for receiving and processing the images from the camera to determine deformation or displacement and strain of the specimen. A light source 18 can provide illumination.

The system can be a component of an integrated system for calculating these material characteristics, or can output the strain and displacement field information to another system.

While the laboratory system shown in FIG. 1 is a example, the techniques described herein can also be useful in measuring displacement and strain on subjects other than specimens and in real world conditions without a loading apparatus. For example, the subject can be a real structure (e.g., as part of or entire building or structure, a part of an entire airplane, a part of a bridge or an entire bridge, a component of a motor vehicle or an entire motor vehicle, a part of a ship or an entire ship) that is deformed under operational loads. In addition, these techniques can also determine displacement-derived information other than strain, such as, for example, the history of deformation over several image frames.

The system described herein relies on a single camera, which faces toward the specimen or material to be deformed.

The particular examples described herein will resolve displacement in two dimensions, e.g., the perpendicular x and y dimensions imaged by the camera. Preferably, the specimen is marked on a planar surface and the camera is positioned with its image plane being parallel to the specimen's marked planar surface. Absolute alignment is not necessary, although errors can be introduced if the camera is not correctly aligned. In addition, the markings can be applied to a non-planar surface, although errors can be introduced as a result of the single camera viewpoint.

Figure 2:
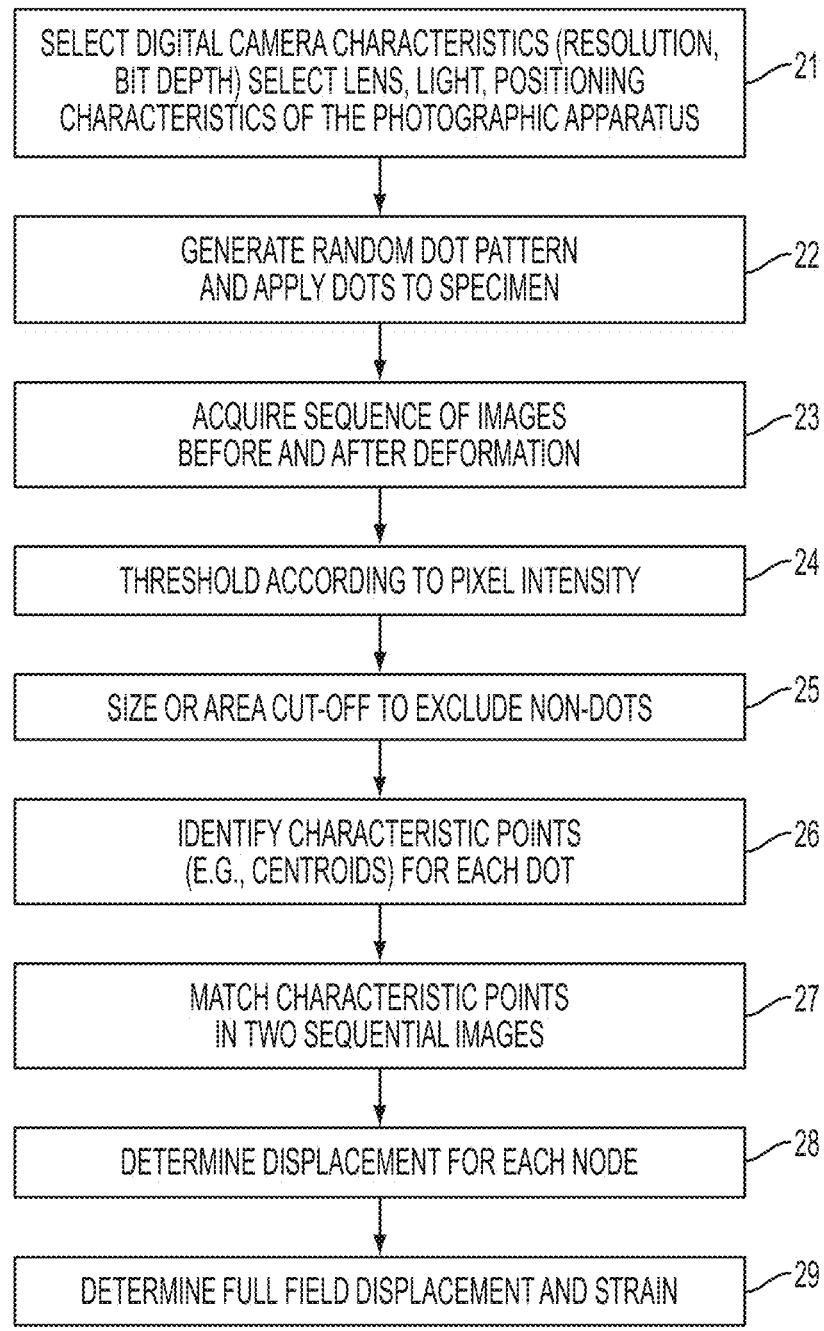
FIG. 2 illustrates exemplary steps for determining full field displacement and strain.
Figure 3:
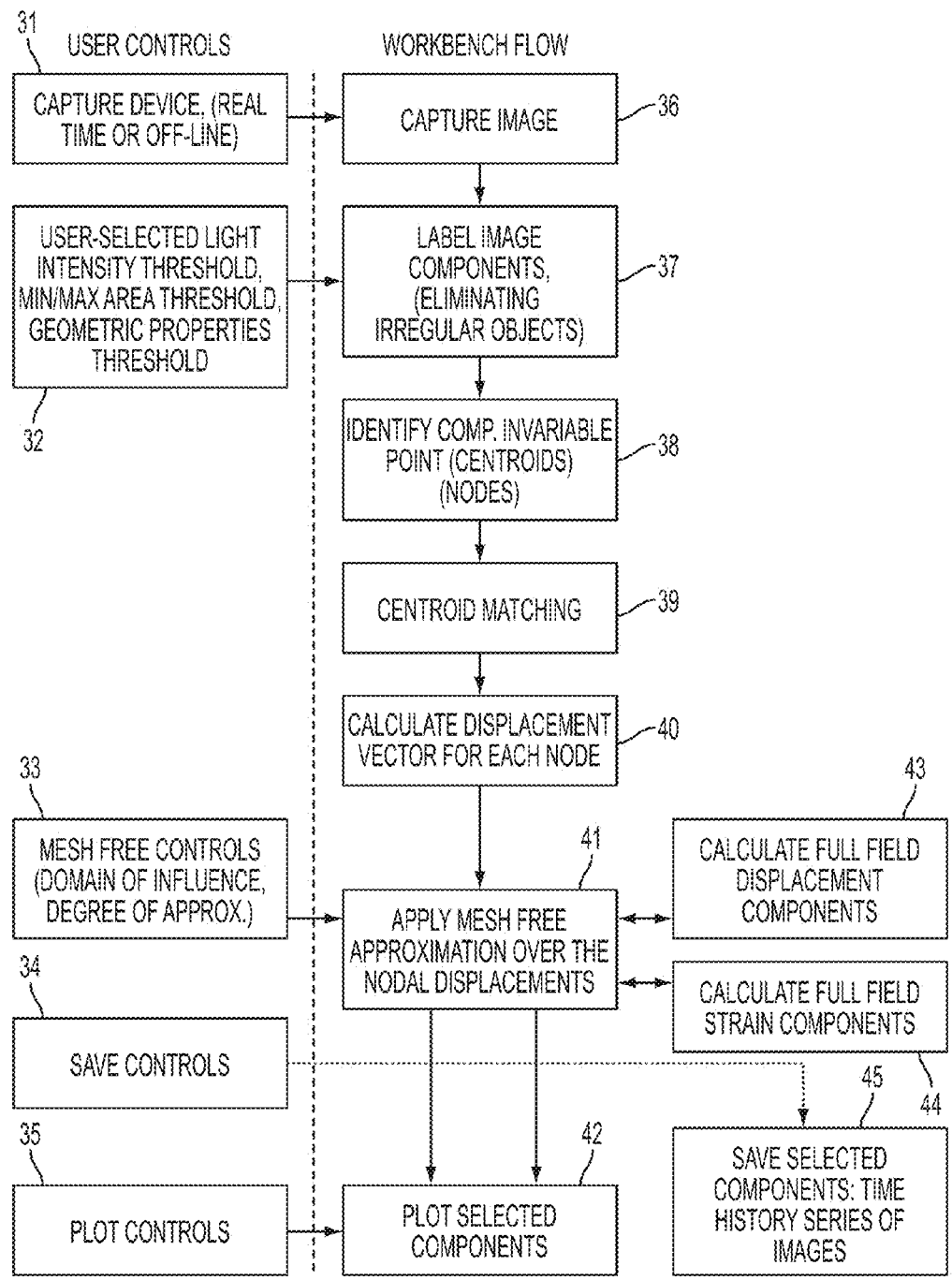
FIG. 3 illustrates computer modules for implementing full field displacement and strain measurement software.

FIG. 2 illustrates schematically an exemplary sequence of steps. FIG. 3 illustrates an exemplary computer-implemented system for accomplishing the methods described herein, showing how user input can be provided into the software modules.

Determining Optical and Specimen Marking Parameters:

As shown in the initial step of FIG. 2, camera characteristics such as camera resolution and depth of field, bit depth, lens type, and other optical features can be chosen 21 to produce accurate displacement and strain estimates across the full field in two dimensions, as will be discussed in later paragraphs.

The method can include generating and applying 23 a pattern of marks to the specimen to be deformed, digitally photographing 23 the specimen after application of the marks, deforming the specimen, and digitally photographing the specimen after deformation. The computer receives the digital photographs and processes the information to determine two dimensional full field displacement and strain fields.

The marks applied 23 to the specimen can be any color that is optically distinguishable from the surface of the body. This distinguishability does not necessarily need to appear at the human visible light wavelength, but can be at any range that an appropriate camera can image. This range can be, but is not limited to, the infrared range, the ultraviolet range, the radar range, the X-ray range, or the gamma ray range. The marks or spots can be of various shapes and sizes, including round dots, squares, ellipses, lines, or random patterns generated by a computer or printer. The marks or spots can be applied by printing ink directly on the specimen, by manually applying printed dots with adhesive, or randomly sprayed onto the specimen. In addition, some subjects have a surface that contain spots that can be regarded as dots, so it is not necessary to apply any additional markings. For very large structures evaluated outside the laboratory, such as a portion of a bridge, the dots can be applied with paint.

In an exemplary embodiment, the marks are round black ink dots printed on a planar surface of a specimen to be deformed.

Dot intensity is the contrast between the dot and the surface of the specimen. More distinct dots produce a higher accuracy result. Dot intensity is usually a dimensionless quantity in the range of 0 to 1.0. Measurements of dot intensity also depend on lighting intensity and the specimen surface texture, so dot intensity can be difficult to measure accurately. One suitable method of improving dot intensity is by applying a thin film on the specimen before marking the pattern of dots. Additionally, increasing the illumination on the specimen can improve dot intensity. Dot intensity values of over 0.6 are recommended for good results.

It is contemplated that a random pattern of dots will be applied to the specimen. In contrast to the pure grid methods, it is not necessary to apply the dots at particular locations on the specimen. However, it is not necessary that the pattern of markings be strictly random. If desired, a uniform grid or other pattern could be used as a basis for applying the markings. As will be discussed in the following paragraphs, several aspects of the method described herein allow markings with non-uniform location, size, and/or shape to be used successfully. This capability can result in accurate results with both cost and time savings.

Acquiring Images and Determining Characteristic Points:

Referring again to the steps of FIG. 2, after digital images of the un-deformed and deformed specimen are acquired by the computer, a labeling module or algorithm identifies 26 an invariant point that is characteristic of each dot in the un-deformed specimen image and the deformed specimen image.

The characteristic points can be centroids of regions in close proximity that share light intensity and/or color characteristics. The characteristic point can be any geometric point that can be proved to be mostly invariable related to the overall position of the dot. Those invariable points may be the light intensity centroids of connected components (dots), the two edges of a line, or characteristic points of a pattern such as the center of a circle or the two foci of an ellipse.

One method for identifying the characteristic points is as follows:

Each image is first thresholded to a black and white representation. For example, pixels with a color or grayscale value below a specified intensity threshold are saved as black and pixels with a color or grayscale value above the specified threshold are saved as white pixels. From this procedure, a new image is generated with its pixels being either black or white. Only those pixels in the original image which have been thresholded to black in the black and white image will be processed by the point matching and subsequent steps of the method.

Figure 4A:
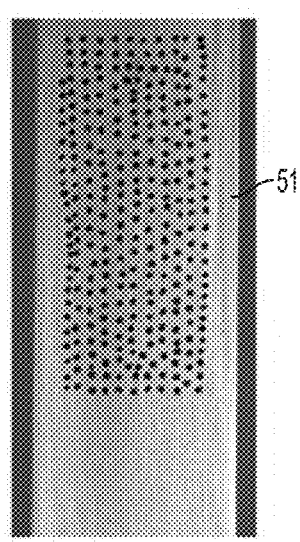
FIG. 4A is a digital image of a specimen with a random pattern of dots before deformation.
Figure 4B:
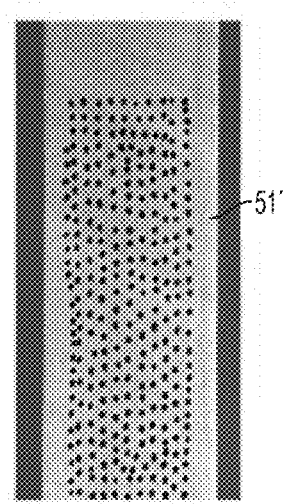
FIG. 4B is a digital image of the same specimen after deformation.
Figures 5A, 5B, 5C, 5D:
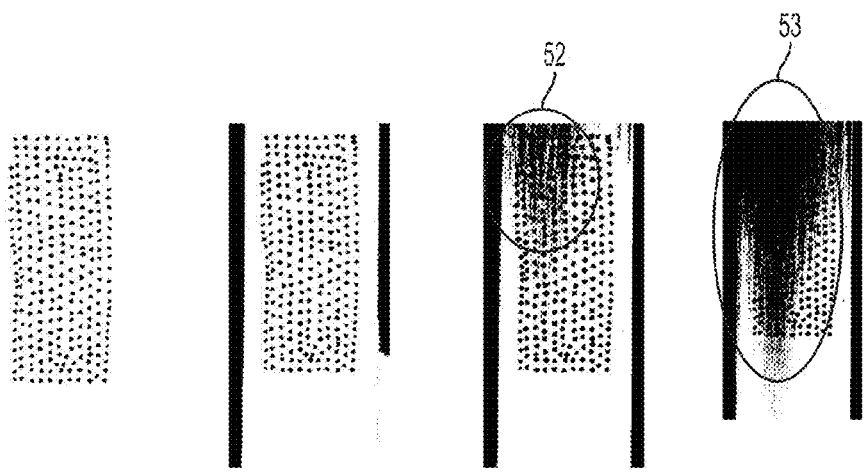
FIGS. 5A, 5B, 5C, and 5D show black and white representations of the original image of FIG. 4A with different threshold values.

FIG. 4A is a digital image of a specimen 51 with a random pattern of dots before deformation, and FIG. 4B is a digital image of the same specimen 51' after deformation. FIGS. 5A, 5B, 5C, and 5D show black and white representations of the original image of FIG. 4A with different threshold values. Note that FIGS. 5C and 5D include many dark areas which are not the applied dots. Thus, it is seen that the threshold values that were used for FIGS. 5C and 5D would create black and white image representations that would produce poor results in identifying dots. The threshold can be stored as a preset value in the computer program. It is also contemplated that if the method is accomplished using digital images from a camera set up with insufficient light or other adverse conditions, the threshold can be adjusted to account for these conditions.

Figures 6A, 6B:
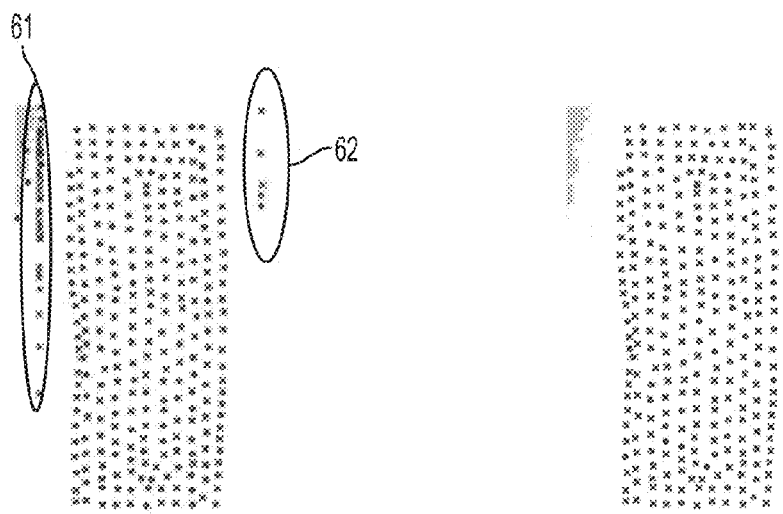
FIG. 6A shows Xs representing dots and some irregular dark objects in the digital image of FIG. 4A.
FIG. 6B illustrates the image of FIG. 6A after an area cut-off is applied.

After a reliable threshold value is chosen, the labeling module's algorithm identifies the connected components (e.g., dots) 26 in the color or grayscale images. The dots are shown as Xs in FIG. 6A. In some cases, this procedure can identify irregular dots that are unlikely to be the applied dots. For example, the edge of the image may include dark irregular areas 61, 62 that are not dots. To avoid errors that could occur if these irregular components are processed as dots, the computer program can also algorithms for distinguishing objects having a pixel area that is too large or too small to be one of the dots. The computer program includes an upper and a lower area cut-off limit, with the applied dots area being between these upper and lower limits. If the object has a pixel area greater than the upper area cut-off criterion or smaller than the lower cut-off limit, the object is considered an outlier and will not be considered in subsequent steps. FIG. 6B illustrates the image of FIG. 6A after the area cut-off is applied. Note that the outliers that represent the image of the edges of the specimen do not appear in FIG. 6B. It is also possible to apply the other steps of the method without applying the image threshold and geometrical cut-off steps, however, errors may be introduced into the results.

Other features can be used to as cut-off criteria, depending on the type of applied marking. Examples include, but are not limited to compactness ratio, direction of major axis, moment of inertia, and aspect ratio.

Figure 7:
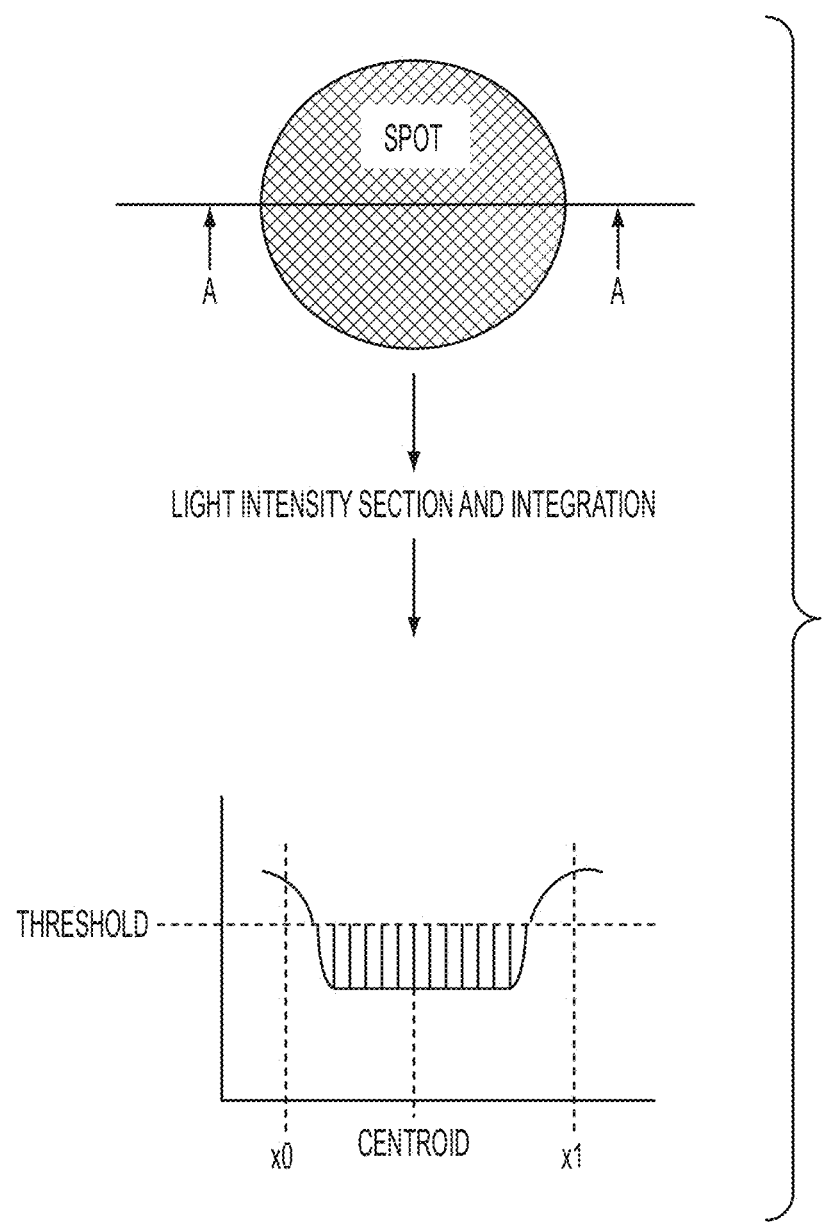
FIG. 7 graphically illustrates a technique of finding a centroid of each dot by integrating the light intensity over the area of each dot in an image.

The centroid is found only for objects that are likely to be the applied marks, e.g., those objects in the image that meet both the thresholding and cut-off criteria. For example, only those pixels in the original color or gray scale image with a corresponding black pixel in the black and white representation is considered. As shown in FIG. 7, the centroid of each dot can be found by integrating the light intensity (e.g., pixel color or grey value) over the area of each dot in the filtered color or grayscale images. Once found, the centroids of the dots in the images can now be considered "Nodes" of a field function for the following point matching steps.

Figure 8:
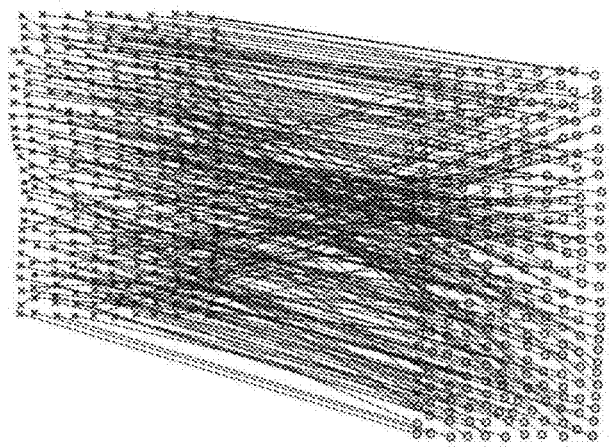
FIG. 8 shows an initial relationship between the un-deformed set of nodes, shown as Xs, and the deformed set of nodes, shown as circles.
Figure 9:
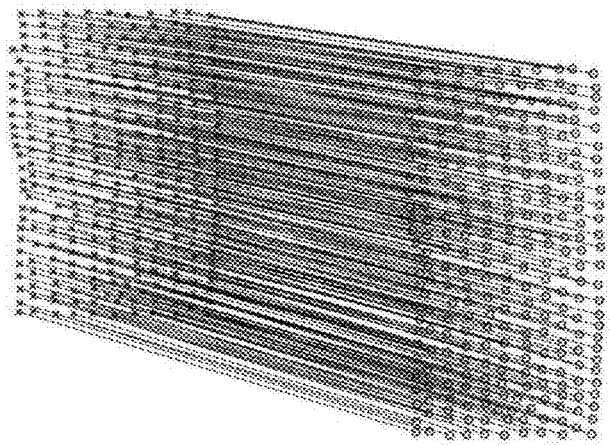
FIG. 9 shows the nodes of FIG. 8 as matched with a naive matching technique.

Node Matching:

Referring again to the steps of FIG. 2, a point matching technique is then used to link or match 27 the nodes between two or more sequential images In an exemplary embodiment, the point matching relies on a naïve matching algorithm. The point matching algorithm can be accomplished by a supervised or un-supervised pattern matching procedure. The matching procedure can be based on, but is not limited to, one or more of the following measures: topological location of points, light intensity measures (maximum, minimum, mean, total, etc.), pixel area coverage of a component, orientation of components, the ratio of the component's width to its height, the moment of inertia on one or two axis, or the ratio of moments of inertia, or the principal axis orientation) or other geometric characteristics. FIG. 8 shows an initially assigned relationship between the un-deformed set of nodes, shown as Xs, and the deformed set of nodes, shown as circles. FIG. 9 shows the correctly matched initial and subsequent image nodes.

Calculating Nodal Displacement:

Referring again to FIG. 2, after the nodes are matched, vector nodal displacement values are calculated 28 by subtracting the positions of the node in the initial image from the position of the node in the deformed or subsequent image.

Determining Full-Field Displacement and Strain Fields:

Once the nodal displacements are determined, they can then be used to determine 29 the displacement field and other displacement-derived fields over the region of interest of the deformed specimen. Examples include, but are not limited to finite deformation tensor, invariables of strain, or combinations of these. In the exemplary example described herein, the displacement and strain fields are determined. The system can also provide displacement data necessary to identify material characteristics such as modulus of elasticity, Young's modulus, crack opening displacement, or identify stress and strain concentration areas. It can be also used to calculate the strength of materials locally or globally, e.g., rotations, finite deformation tensor, invariables of strain, or combinations of these.

The term "full-field" refers to the capability to determine displacement and displacement-derived components over any point in the entire region of interest, and is not to be construed as requiring estimation of these quantities at every available point in the field. The calculation can be done at implicitly determined points so that certain functionality is achieved or at explicitly defined points of the field. For example, in order to visualize the field on a computer screen, a finite number of values need to be calculated at positions that cover the region of interest. In another situation, a user of the method may desire to calculate the values of the deformation field at hot-spots, or at positions regarded as critical for the analysis.

Many techniques can be used to approximate or interpolate the field represented by the identified nodal displacements, including Element Methods, B-Splines, Non-Uniform Rational B-Splines, Fourier Series representation, SVD surface representation, etc. One technique that is used to approximate the displacement field applies mesh-free functions directly on the nodal values defined within a field of support. Mesh-free functions in conjunction with the element methods do not require definition of a mesh to represent field variables.

Figure 10:
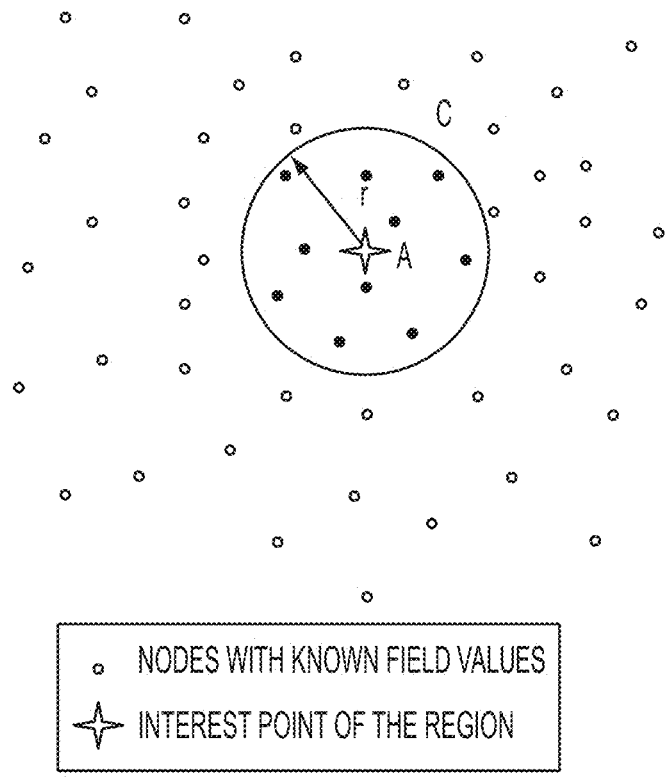
FIG. 10 illustrates a support domain for nodes with known displacement values.

As an example, consider that the values of a field function (e.g., the x component of displacement) are known at the points or nodes shown in FIG. 10. The calculation of the x component of displacement value at a point A (with A not being a nodal point) can be accomplished by performing an algebraic combination of the nodal values within the circle C. Two important control parameters for a mesh-free method will be the radius of the support domain (e.g., circle C), and the type of the basis used in the construction of the shape function that locally represents the field. Construction of the polynomial basis can be based on a number of methods, as described in G. R. Liu, "Mesh Free Methods", CRC Press, (2003), the entire disclosure of which is incorporated by reference herein.

The computer program similarly calculates strain in the field using the derivatives of mesh-free functions, or by numerical differentiation at selected points.

The mesh free approximation parameters can be controlled by the user via devices such as switches or knobs, or by software controls on the workstation graphical user interface. Alternatively, these control parameters can be automated, or stand as a recursive loop that finds the best values to be applied.

Choice and Selection of the Optical Set Up:

The optical setup of a system that measures deformation on the surface of a specimen can be optimized as follows.

The length metric of digital imaging is pixels. Most digital cameras have an aspect ratio of 4:3, although other aspect ratios are also suitable. As an example, a 1.92 megapixel digital camera with a 4:3 aspect ratio will represent pixels on a grid of 1600 pixels×1200 pixels.

The fact that the image plane is chosen to be parallel to the specimen plane, suggests that there is a one to one relationship between the real world coordinate system, measured in physical length units such as meters, and the image coordinate system, measured in pixels. For simplicity, consider that a length in the physical coordinates $L_r$ can be converted to image coordinates by multiplying it by a scale factor. Since this relationship can be used to convert between image units and real world units, the following discussion will address only the image units of pixels.

The software implementation of the method assumes images from a steady camera, therefore, the user should ensure that the region of interest is fully visible by the camera in all frames as follows.

FIGS. 11A and 11B show a simple tension experiment with a specimen 110 in a load tester 112. The free length of this specimen is 200 mm and the expected total elongation before break is about 20%. The region of interest 116 will be at the center of the specimen 110, and have dimensions of 30×20 mm.

It is preferable that the zoom level be set at the maximum possible permitted by the experiment to maximize precision. In this example, the horizontal dimension (width) of the region of interest 120 is 30 mm. If the camera is used at full zoom, so that this horizontal dimension fills the horizontal dimension of the view frame, the vertical view dimension of the camera will be 30 mm×3/4=22.5 mm. However, the expected elongation is about 20%, which must also be included in determining the size of the image focus region 114 in order to capture the entire region of interest in all the frames.

A point 120 on the lower edge of the region of interest is located at a vertical distance from the fixed grip of:

$$y_L = \frac{\text{specimen length}}{2} + \frac{\text{Height of ROI}}{2}$$
$$= \frac{200}{2} \text{mm} + \frac{20}{2} \text{mm}$$
$$= 110 \text{ mm}$$

where ROI is the region of interest of the specimen or body to be deformed.

After the deformation has been applied, this point 120' will have moved by about 20%. Thus, the total vertical length that must be accommodated within the image will be:

$h = h_{roi} + 22 \text{ mm} = 20 \text{ mm} + 22 \text{ mm} = 42 \text{ mm}$ $w = (4/3)h = (4/3) \times 42 \text{ mm} = 56 \text{ mm}$ Therefore, the image region on the plane of the specimen will be 56×42 mm.

Since the horizontal dimension of the image region on the plane of the specimen is 56 mm, the scale factor should be: s=1600/56=28.571 pixels/mm. The same result is evaluated by using the vertical dimension: s=1200/42=28.571 pixels/mm. The dimensions of the region of interest can be directly calculated, since the specimen is planar, as:

$w_i = sw_r = 28.571 \times 30 = 857.14$ pixels $h_i = sh_r = 28.571 \times 20 = 571.43$ pixels In some experiments, such a simplified estimation cannot be achieved. In those cases, only trial and error procedures can be applied to estimate the extent of the image region of interest.

It is noted that the configuration depicted in FIG. 11 will vary greatly depending on the nature of the experiment. For example, in an experiment that elastic deforms a specimen from a typical steel alloy, the maximum strain is expected to be between approximately 0.2% to 0.6%, and the region of interest will visually change its position by a very small amount. However, if the experiment is to be done on a polymeric specimen with expected elongation of 100%, this constraint will likely dominate the choice of the photographic configuration. If there is no evidence on the expected elongation, it is a good practice to first try a control experiment to estimate the elongation.

It is a good practice not to try to pursue absolute accommodation of the experiment region of interest within the image area. If elongation is more than expected, and a portion of the region of interest therefore extends outside the image limit, the system may produce unpredicted results. In addition, many lenses have relatively large distortions near their edges and measurements at those regions may results in error values higher than the usual.

Lens Selection:

Cameras with either a zoom lens or a prime lens can be used to collect the images of the specimens. A prime lens has a fixed focal length, while a zoom lens has an adjustable focal length. As a result, the prime lenses are less versatile, but, because they can have fewer elements than a zoom lens, the prime lenses will typically have superior optical qualities and smaller systematic optical errors.

The distance between the camera and the specimen will depend on the size of the specimen and the experimental configuration. In most practical instances, a suitable distance will be between about 20 and 80 cm.

An important characteristic of a lens is its focal length (f). The choice of focal length can determine the effective dimensions of the subject. The relationship between the focal length, the distance between the object and the lens, and the object's characteristic dimension is given by:

$$f = a\frac{D}{t},$$

where f is the focal length, D is the distance from the object to the lens, t is the object's dimension, and a is a parameter that depends on the CCD size of the camera. Some typical values of a are shown in the following table:

TABLE 1

| | CCD size | | | | |
|---|---|---|---|---|---|
| | 1 inch | ⅔ inch | 0.5 inch | ⅓ inch | 0.25 inch |
| Horizontal dimension "a" | 12.7 | 8.8 | 6.4 | 4.8 | 3.4 |
| Vertical dimension "a" | 9.6 | 6.6 | 4.8 | 3.6 | 2.4 |

For example, the following steps can be used to estimate an appropriate lens focal length for a specimen with an image region of about 56×42 mm, a distance of 50 cm between the lens and the specimen, and a camera with a CCD of 0.5 inches. From the table above, the horizontal dimension "a" will be 6.4. The focal length can be approximated as f=a (D/t)=6.4(50 cm)/(56 mm)=57.14 mm This focal length approximation can be evaluated by estimating the focal length for the horizontal dimension "a" value of 4.8, as f=a(D/t)=4.8(50 cm)/(42 mm)=57.14 mm.

The following example illustrates how to select a zoom lens that is suitable for performing a variety of experiments. Here, the required imagery vertical size varies between 3 cm and 20 cm, the distance between the lens and the specimen will be in the range of 30 cm to 120 cm, and the camera is considered to have a ⅓ inch CCD sensor. The focal length equation, as described earlier, can be used determine the minimum and maximum values for focal length as shown in the following table:

TABLE 2

| | vertical image size | | | |
|---|---|---|---|---|
| | 30 mm | 30 mm | 200 mm | 200 mm |
| a (from table 1) | 3.6 | 3.6 | 3.6 | 3.6 |
| distance from lens D | 200 mm | 1000 mm | 200 mm | 1000 mm |
| calculated focal length f | 24 mm | 120 mm | 3.6 mm | 18 mm |

Notice that at the minimum distance D=200 mm, a lens with a 18 mm focal length is suitable, and that at the maximum distance D=1000 mm, a lens with a 24 mm focal length is suitable. Therefore, a zoom lens that includes focal lengths of 18 mm to 24 mm would be suitable for the whole range of distances from 200 mm to 1000 mm.

Choice of Dot Pattern Parameters

There are many parameters that contribute to the accuracy of the method describe herein. One factor to be considered is camera selection. For general laboratory use, a true 8-bit camera with at least 2 megapixel resolution is adequate to produce displacement accuracy in the range of $3 \times 10^{-3}$ to $5 \times 10^{-2}$ pixels and strain accuracy in the range of about 50 to 500 μstrain. Note that the $3 \times 10^{-3}$ pixel lower limit of displacement accuracy is expected for larger dots. The lower limit of strain accuracy is expected on uniform fields.

The main parameters that affect the precision of this method are dot radius, dot distance or grid density, dot light intensity relative to the specimen surface, and camera bit depth and resolution.

To evaluate the effect of dot radius, assume that the dots will be circular with a radius r. The discussion can be generalized if the radius is converted to area for an arbitrary shape, or two more dimensional measures if the shape is of a known form. The dot radius is an important factor. Because the system uses light intensity integration to identify the centroid of each dot, it is subject to the hidden mean deviation law, which can be states as follows: the more pixels a dot occupies, the more precise the centroid identification will be. However, the size (radius) of the dot is limited because there must be enough dots in the region of interest on the specimen to sufficiently represent the variations of the measured fields (e.g., displacement and strain).

In general, the chosen dot radius should not be lower than three pixels, and the dot should cover at least 25 square pixels. Dots with a radius of 8 to 10 pixels or more can provide very accurate displacement measurements using the method describe herein. Performance sensitivity of mesh free methods is discussed in Iliopoulos, A. P., Performance Sensitivity Analysis of the Mesh-Free Random Grid Method for Whole Field Strain Measurements", Proc. ASME DETC2008, August 2008, Brooklyn, N.Y.

As discussed above, the dot intensity is the contrast between the dot and the surface of the specimen. The dot intensity values of over 0.6 yield very good results. Increasing the light on the specimen, applying a thin film on the specimen before applying dots, or darkening the dots can improve dot intensity.

The distance between the dots defines the density of the dot grid, and is an important parameter affecting the accuracy of strain measurements. The effect is tightly bound with the approximation of the field variables. In cases where the strain field is expected to be uniform, increasing the dot distance can provide more accurate results. In cases in which the strain field is irregular, increasing the dot distance has an opposite effect due to large unsupported areas of the field.

The minimum distance between centroids of the dots should be chosen so as to allow the programmed computer to correctly identify the dots. Preferably, the mean distance between dot centroids is related to the dot radius r by d=4+2.1r, where d is the mean distance between dot centroids, or "mean dot distance". Because the pattern of dots will be randomly applied, this mean dot distance can only be considered a statistical quantity, with some distances greater than the mean dot distance and some less than the mean.

The following equations provide an estimate of the number of dots that are needed on a rectangular area of width w and height h. In these equations, n is the number of dots in each column and m is the number of dots in each row.

$$n = \frac{\sqrt{w \cdot h}}{d} \left( \frac{w}{h} \right)$$

$$m = \frac{\sqrt{w \cdot h}}{d} \left( \frac{h}{w} \right)$$

The camera bit depth represents the number of gray levels the camera can distinguish, and is a property of the CCD or CMOS sensor. An 8-bit camera can distinguish $2^8$ or 256 levels of gray. Since the displacement and sensing system takes advantage of the sub-pixel effect for centroid identification by accounting for shades of gray, the bit depth has an effect on the accuracy. Higher bit depth results in higher centroid identification accuracy. Both true eight-bit cameras and ten-bit cameras provide good results.

Estimate of the Measurement Uncertainty:

Many manufacturers provide high bit output cameras that are not supported by the CCD capabilities. A more accurate measure of the gray level resolution of a camera is estimated by the dynamic range of the camera. The dynamic range (DR) describes the number of gray levels the camera can distinguish, and is defined by:

$$\text{Dynamic Range} = 20 \log \frac{\text{Depth Well}}{\text{Readout Noise}}.$$

The dynamic range is usually given in decibels (dB) and measured against a black body. Some manufacturers use the alternative measure Signal to Noise ratio (SNR), which represents the ratio of the Depth Well and the Readout Noise.

A conversion between dynamic range and the effective sensor bits is given by the equation:

$$\text{bits} = \log_2 10^{DR/20}.$$

The camera resolution represents the number of pixels of the CCD in the horizontal and vertical dimensions. Higher camera resolution affects the number of dots, and the radius of dots, that can be accommodated within an image.

The accuracy of the position of a single pixel can be calculated by $$\sigma_L = \frac{thr}{2^{bits}} \text{pixels},$$

where thr is the mesh-free random-grid method (MFRGM) dot intensity threshold described previously, and bits is the bit depth of the camera sensor. General information regarding position accuracy is described in Sevenhuijsen, P. J., "Two simple methods for deformation demonstration and measurement", Strain, Vol. 17, No. 1, (1981), and takes into account the sub-pixel accuracy of centroid identification methods.

Because measurement is done over a number of measurements (e.g., the integration of the dot light intensity domain), the mean error in pixel position will be approximately:

$$\sigma_{L,mean} = \frac{thr}{2^{bits} \sqrt{N}} \text{pixels},$$

where N is the number of measurements. The number of measurements for this method is equal to the number of pixels a dot occupies and can be approximated as the area of a circular dot of radius r. Thus, the mean error in pixel position is:

$$\sigma_{L,mean} = \frac{thr}{2^{bits}\sqrt{\pi r^2}} \text{ pixels.}$$

Taking into account the uncertainty propagation, the minimum engineering strain (elongation) error can be calculated according to:

$$\sigma_\varepsilon = \sqrt{2}\frac{\sqrt{2+\varepsilon^2}}{L_0}\sigma_{L,mean},$$

where $\sigma_\varepsilon$ is the minimum strain error, $L_0$ is the mean distance between the dots in a particular region, and $\varepsilon$ is the calculated strain. These equations for mean error and minimum engineering strain error are used as approximate measures of the highest possible accuracy of the mesh free random grid method describe herein, and will apply to uniform fields. These formulas, however, don't take into account the lens and the field approximation uncertainties, so they should be used only for a rough estimate of the error.

Figure 12A:
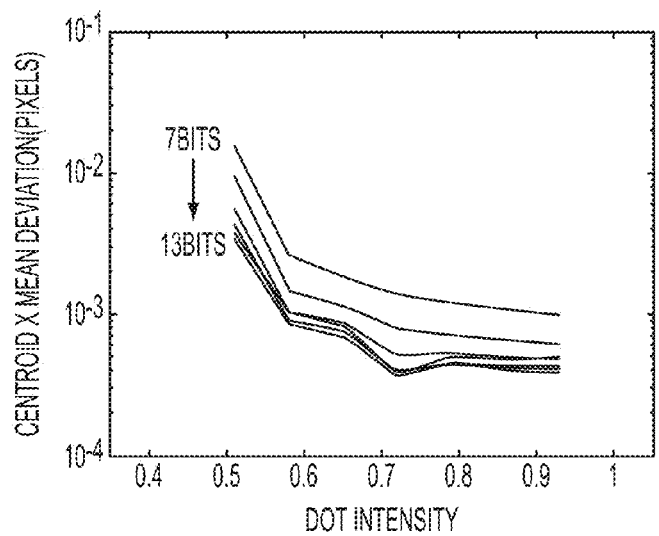
FIG. 12A, 12B, and 12C provide plots of displacement deviation with respect to dot intensity and image bit depth, based on simulations.
Figure 12B:
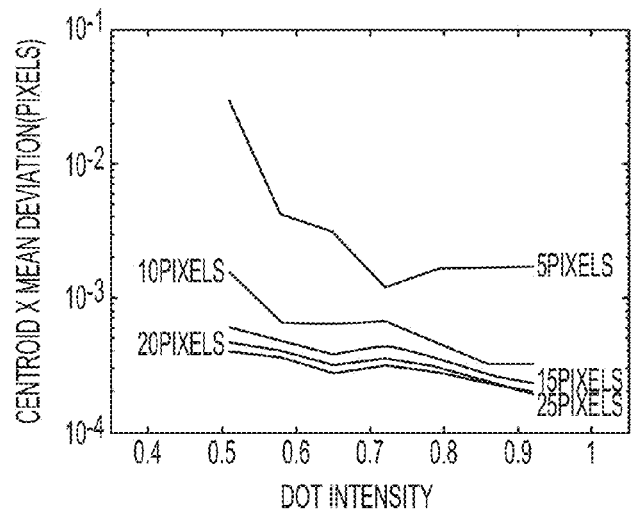
Figure 12C:
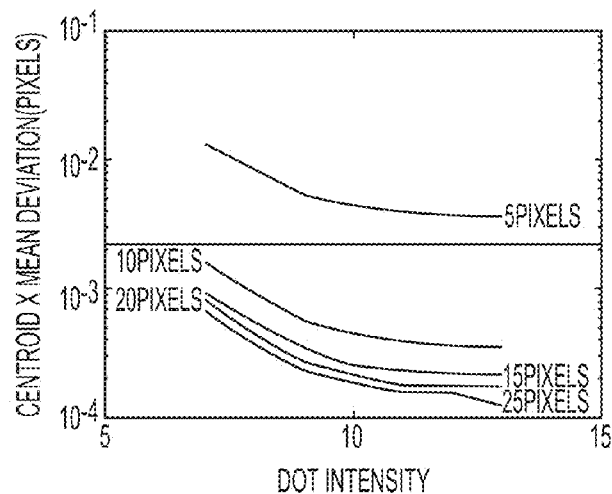

FIGS. 12A, 12B, and 12C provide plots of displacement deviation with respect to dot intensity and image bit depth, based on simulations. These figures can assist the user in selecting appropriate camera equipment and estimate the expected error in displacement and strain. Reference is also made to Iliopoulos, A. P., Performance Sensitivity Analysis of the Mesh-Free Random Grid Method for Whole Field Strain Measurements", Proc. ASME DETC2008, August 2008, Brooklyn, N.Y., the entire disclosure of which is incorporated herein by reference.

As an example, FIG. 12A includes a shaded area that illustrates the camera bit depth that will achieve a desired accuracy, where the accuracy corresponds to a maximum value for "centroid x mean displacement" in pixels.

It can also be useful to estimate uncertainty in the strain measurement. Consider that the known position of two points in a region $R^1$ are $x_1$ and $x_2$, with a standard deviation of the position measurement of $\sigma$. The distance $L_0$ equals $x_2-x_1$. The standard deviation, through uncertainty propagation, but without considering a covariance term will be $\sigma_{L_0}=2\sigma$.

When the specimen is deformed, the points will be translated to $x_1'$ and $x_2'$, and the new distance between them will be $L=x_2'-x_1'$. The standard deviation of the new distance L is known with a standard deviation $2\sigma$. The difference in the distance is $\Delta L=L-L_0$, with an uncertainty of $\sigma_{\Delta L}=\sqrt{(\sigma_L^2+\sigma_{L_0}^2)}=2\sigma$.

The engineering strain is defined as $$\varepsilon = \frac{\Delta L}{L_0} = \frac{L-L_0}{L_0}$$

and its derivation can be calculated to be $$\sigma_\varepsilon = \sqrt{2}\frac{\sqrt{2+\varepsilon^2}}{L_0}\sigma_L.$$

Choice of Digital Camera Characteristics for Given Requirements:

When the user needs to identify an appropriate camera for a specific experiment the following steps can be followed:

1. Consider an initial estimation of the chosen CCD, the extent of region of interest, and the expected deformation field. Estimate an appropriate number of sampling points (dots) that can describe the field. For example if a sinusoidal variation of strain is expected, the number of dots spanning a wavelength should be at least eight to ten.

2. Consider an appropriate standard deviation for the expected engineering strain levels ($\Delta L/L_0$) identify the desired deviation for displacement ($\sigma_{L,mean}$).

3. Identify the appropriate radius of the dots and the bit depth based on the value for the displacement deviation found in step 2 and FIG. 12C. If necessary, the graphs of FIG. 12A and FIG. 12B can be used to converge to more exact values.

4. Ensure that the number of dots from step 1 from the radius identified in step 3 can be accommodated in the CCD's resolution.

5. Repeat steps 1-4 to converge to a choice.

The user can decide between several different options based on engineering judgment. For example, one user might prefer a CCD with higher bit depth, and another would prefer a CCD with higher resolution.

Higher resolution usually scales better with accuracy, but reduces performance. On the other hand, resolution is highly affected by the lens and currently, CCDs with more than 8 to 10 megapixels can require a very high quality lens system to be fully utilized.

Note that the estimation on the error from the procedure described here is only a guide, since real cameras characteristics vary greatly and the accuracy can depend on uncontrolled parameters.

Another example is provided to illustrate camera selection for another set of requirements. For an experiment, a total of 20×30 =600 dots with a relative ratio are required to provide a good approximation of the expected deformation field. An accuracy of strain of 200 µstrain (when expressed as deviation from the mean) at the expected maximum of 10% is desired. The camera is assumed to have a horizontal dimension aligned with the direction of deformation and the un-deformed specimen's region of interest occupies 60% of the image. The camera's resolution is 1600×1200 pixels.

The region of interest will horizontally span approximately 60% of the 1600 pixels, or about 960 pixels. The vertical span of the region of interest is 960 pixels multiplied by a ratio of 20/30, or about 640 pixels. Therefore, the region of interest will extend over an area of 960×640 =614400 pixels. Each dot will cover an area of 614400/600=1024 square pixels. Consider that each dot will occupy a square area of a×a, so the dot's dimension will be equal to the square root of 1024 pixels, or 32 pixels. The distance d between the dots can be found as $$d=\sqrt{a^2+a^2}/2=22.5 \text{ pixels.}$$

The equation d=4 +2.1r can be used to estimate the maximum radius of the dot that can be used as: $r_{max} \approx 8.5$ pixels.

From the equation for $\sigma_\varepsilon$ above, with $\sigma_\varepsilon=200\cdot10^{-6}$, $\varepsilon=10\% =0.1$ and $L_0 =d =22.5$ it can be calculated that $\sigma_{L,mean}=0.00224$ pixels $=2.24\times10^{-3}$ pixels. In FIG. 12C the region within which a choice can provide the desired accuracy is shaded. From that figure it can be estimated that a good choice will be a camera of 10 bits or more, but the desired accuracy can be marginally achieved with an 8-bit camera.

Software Implementation

An aspect of the invention is directed to a computer software application configured as programmed instructions for implementing the two-dimensional mesh free random grid method described herein.

In such a software implementation, user input can be provided through a graphical user interface (GUI). The mesh free approximation is controlled by the user either by manual control devices or software. The control parameters can be also automated, or stand as a recursive loop that identifies the best values to be applied. The calculation of the field variables is applied over displacement and strain.

The software system also contains visualization functionalities. The visualization of the measured components can be done for displacements, strain and can be but not limited to contour plots, iso-surfaces plots, 3d surface plots, 2-d and 3-d scatter plots, line plots over horizontal, vertical, inclined or general lines and curves, history plots, chosen gauge locations and standardized gauge locations. All the measurements can be executed at manually or automated chosen locations and may vary over time and frame. The medium of the visualization can be, but is not limited to, CRT monitors, LCD monitors, plasma TVs, projectors, photo frames, or printers.

The computer-based system also contains storage capabilities. All the acquired data, including images, frames, time history, plots, deformation, displacement and strain data, fitting parameters data can be controlled and stored locally or transmitted over a network. The storage can be done in a preferred user location, or automatically chosen by a software algorithm. Subsequent frames can be stored either as single files or as a single history file (including but not limited to strain, displacement, deformation, fitting parameters, image files, video files, contour data, 2D/3D scatter and surface data, etc.).

The user controls and the visualization apparatus can be integrated in a single graphical user interface, or operated by external device in any combination. The choice of the control parameters can be done by switches, dials, text boxes, or hardware equivalents.

In one example, the main program is in python computing language, with some low level routines written in c++ utilizing boost libraries. It can be implemented on a PC with operating systems including Windows XP, Vista, and GNU/Linux, OpenSolaris, or Mac OS X.

REMDIS 2D is a software tool that implements the Mesh Free Random Grid Method (MFRGM) for full field remote displacement and strain measurements.

One version of the system is written in UBUNTU/GNU LINUX and will run on DEBIAN based platforms. For this version, the following libraries should be installed and configured: python 2.5, PyQt4, scipy, numpy, PIL (Python Imaging Library) and pyVTK. The application has been also ported and tested on Windows XP and Vista.

The system software can capture specimen images from a directory as they become available (e.g., for real-time runs) from external image acquisition devices or capture specimen images from a directory that already contains images of an experiment. The system software can control the main pipeline parameters such as max/min component area cutoffs, thresholding, radius of mesh free domain of support, and mesh-free Pascal triangle degree. The system also allows a simplified choice of image scale. In addition, the system can produce contour plots of displacement and strains over the whole field of interest and exhibit results saving capabilities (e.g., full field images and gauge point deformation history). The system also supports arbitrarily non-rectangular and multiply connected domains.

Figure 13A:
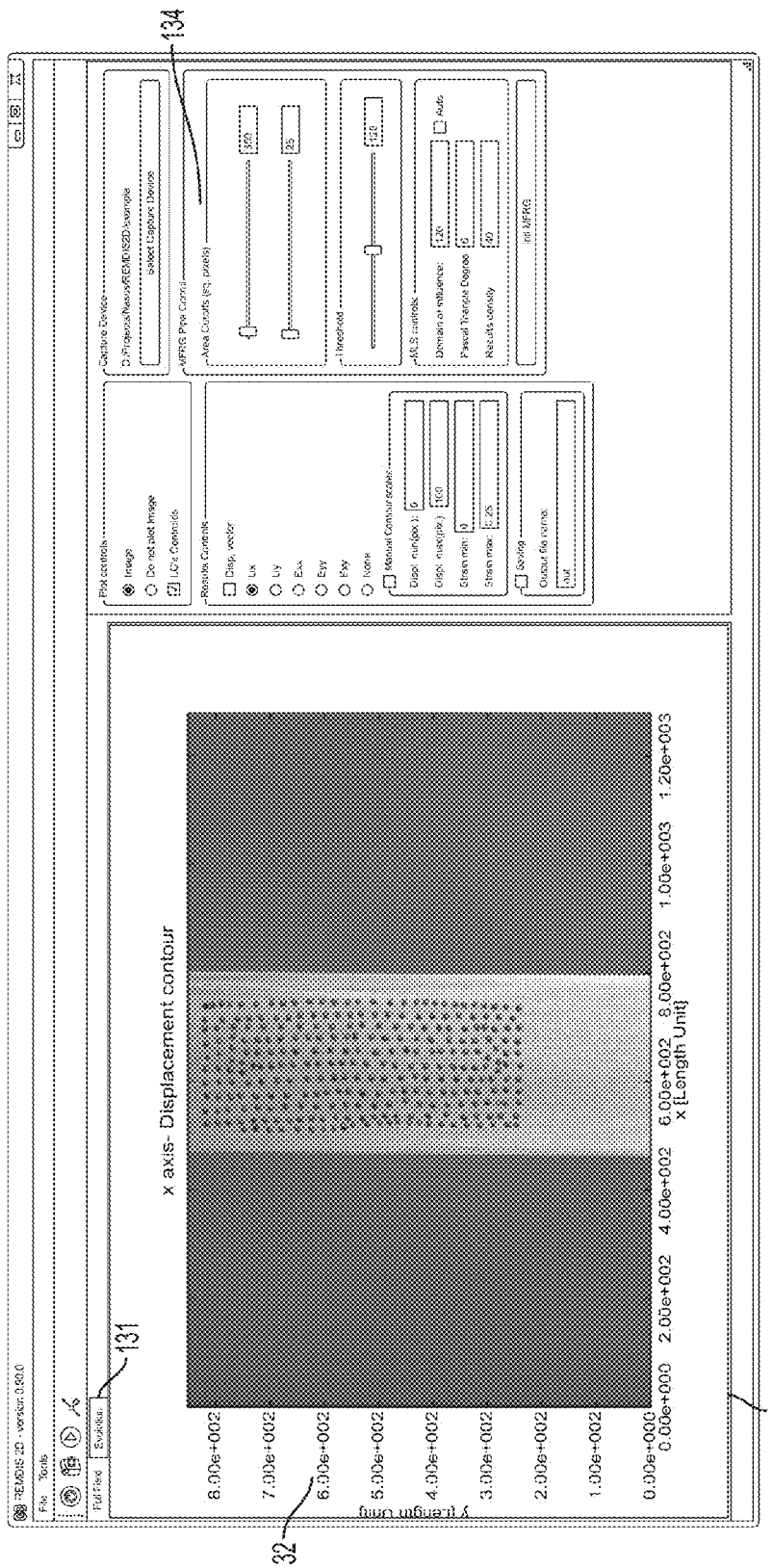
FIG. 13A-13F are screenshots generated by the exemplary software implementation of a displacement and strain measurement method and illustrate aspects of the graphical user interface.

An example main screen layout of the application is presented in FIG. 13A and includes four main regions: Region 131 contains the Main Menu and the Toolbar; Region 132 is the location for plotting the displacement and other measured values; Region 133 is the status bar, where important messages are printed; and Region 134 is the controls toolbox.

Figure 13B:
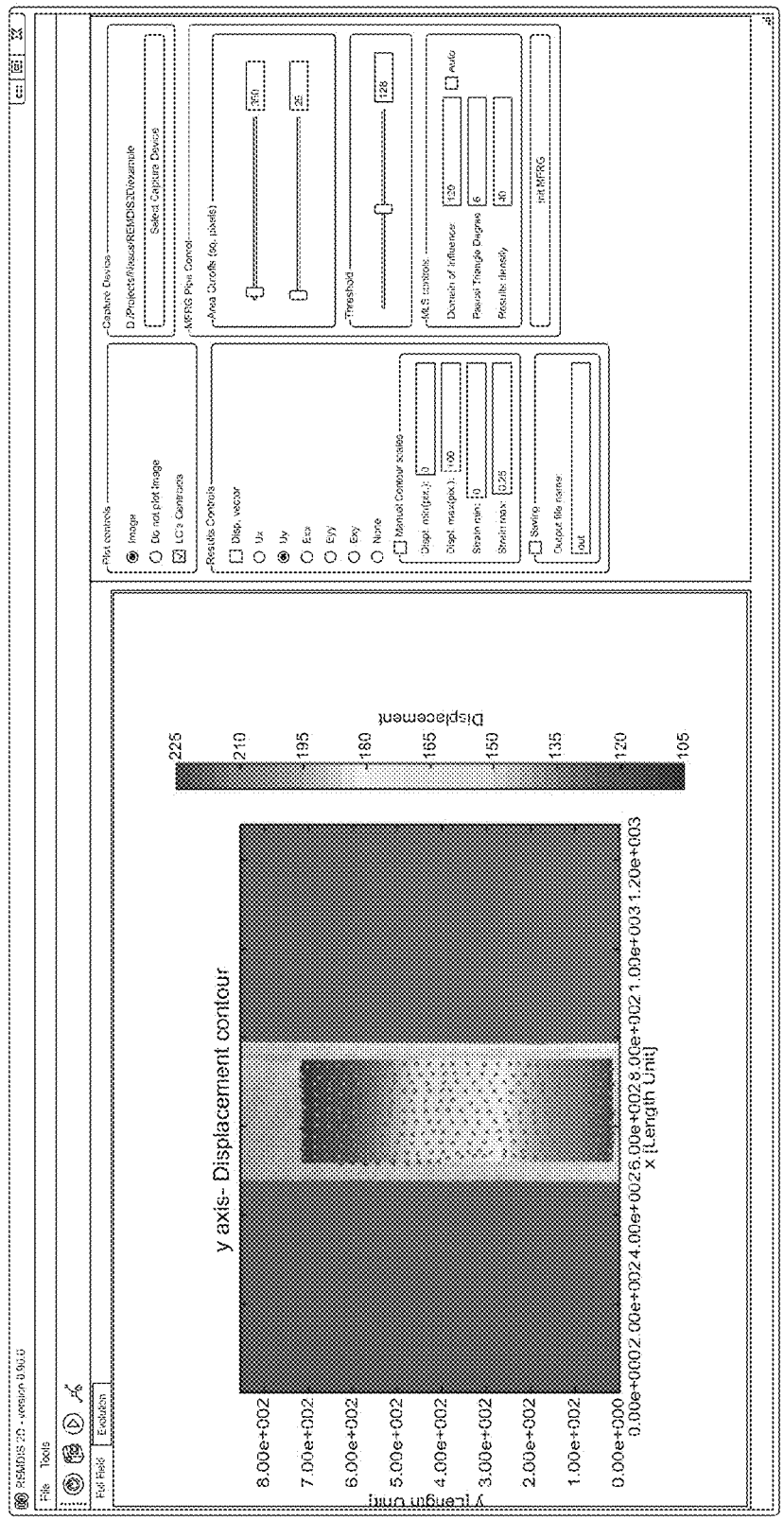
Figure 13C:
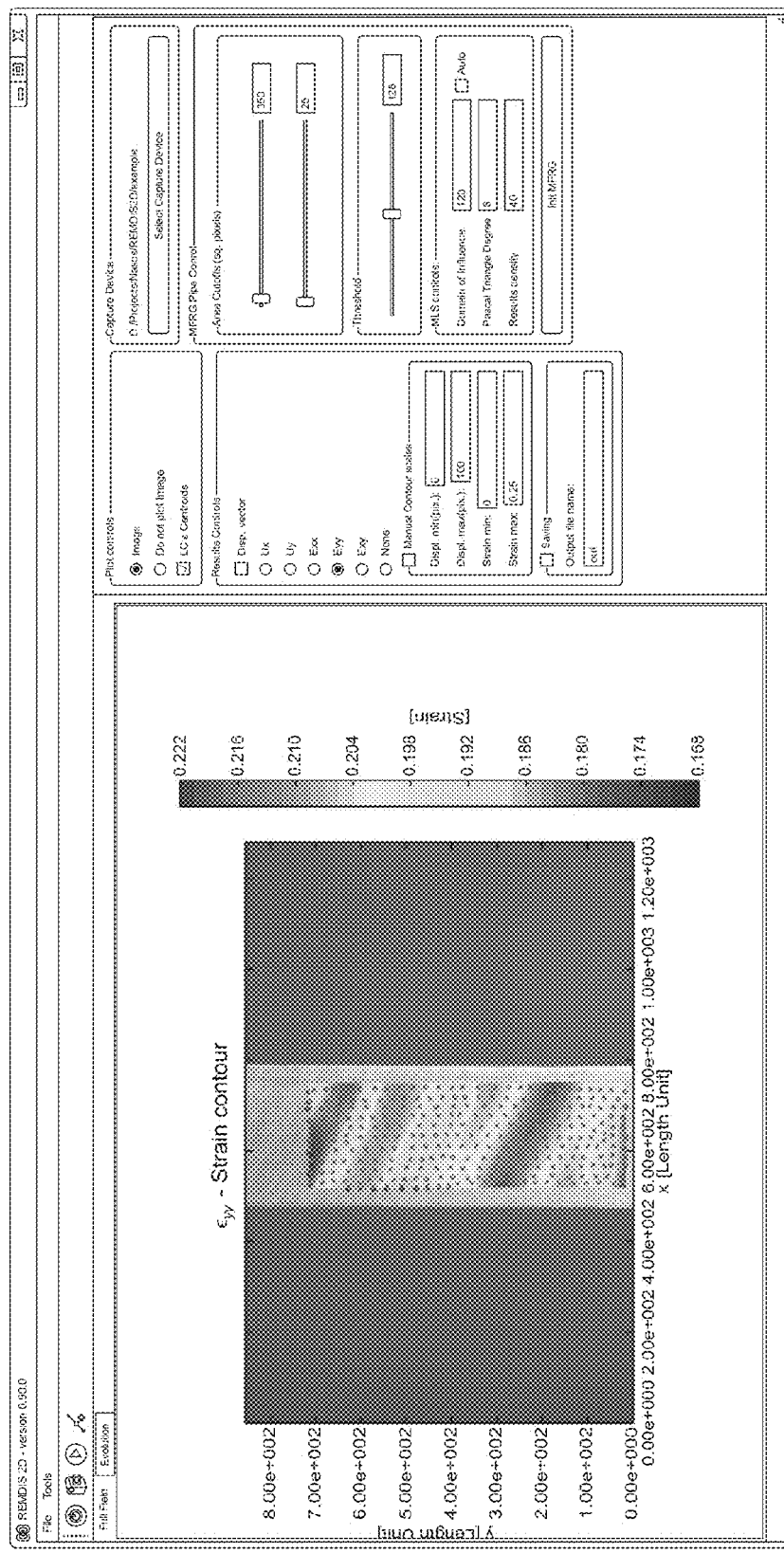
Figure 13D:
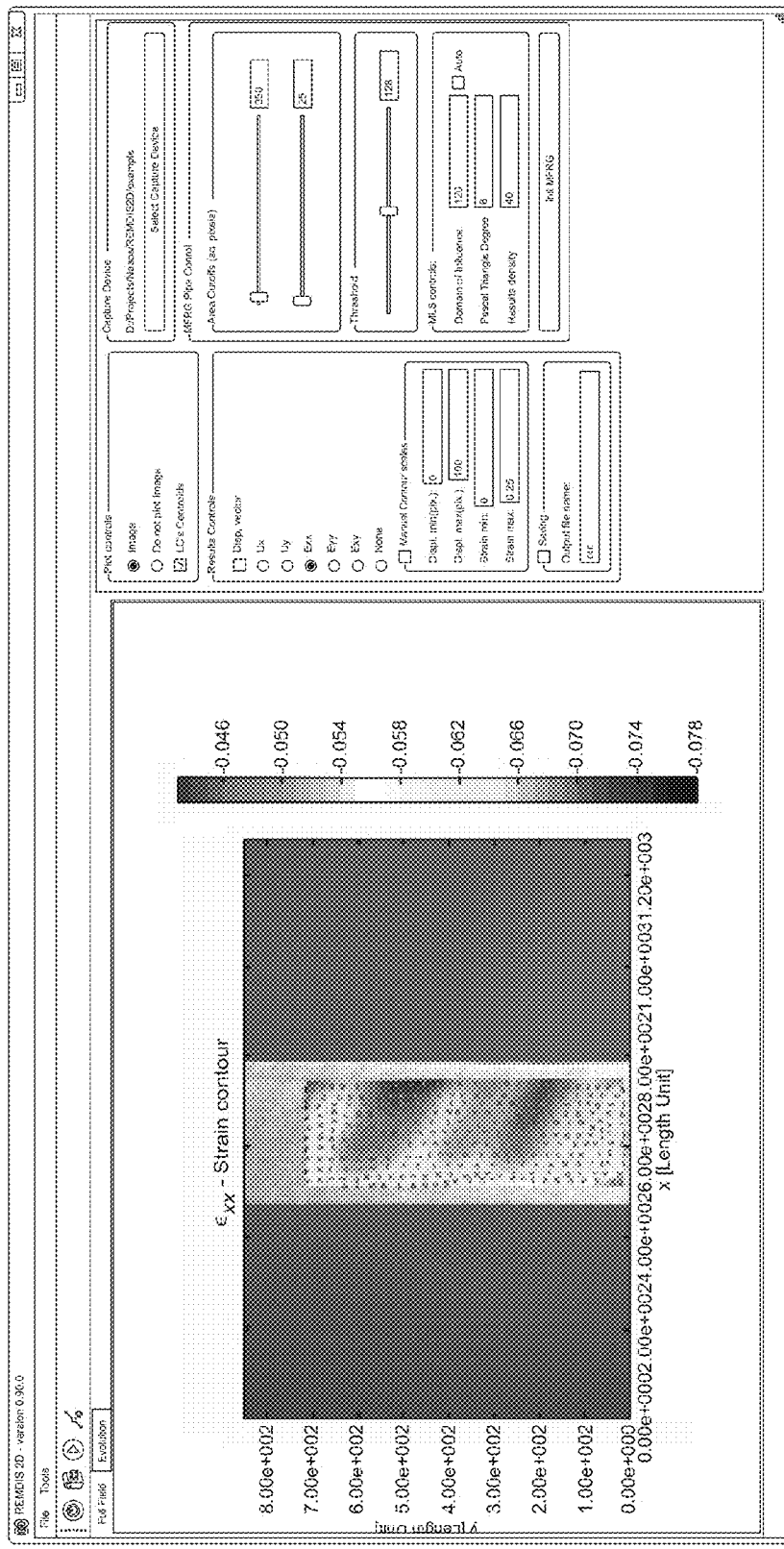
Figure 13E:
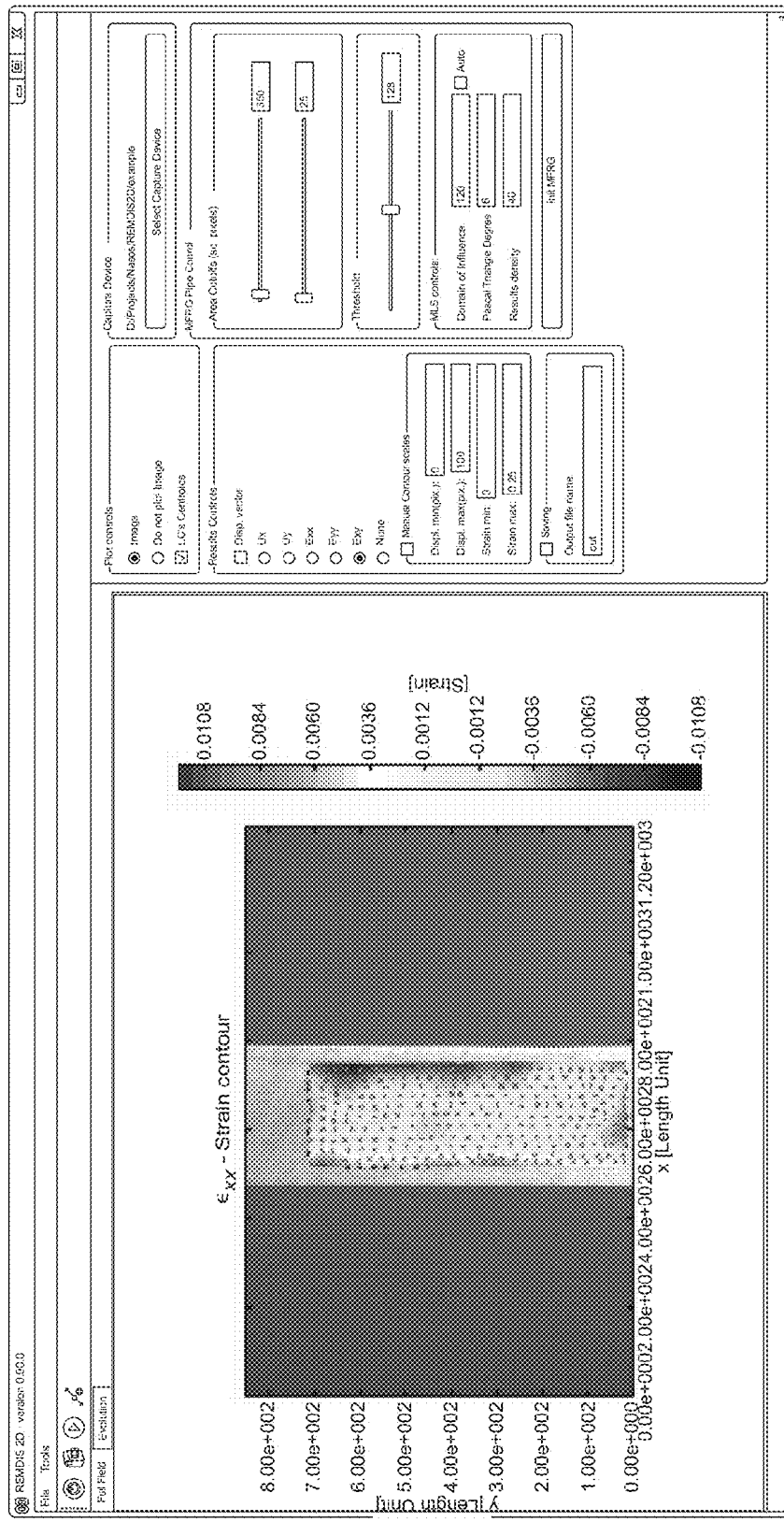
Figure 13F:
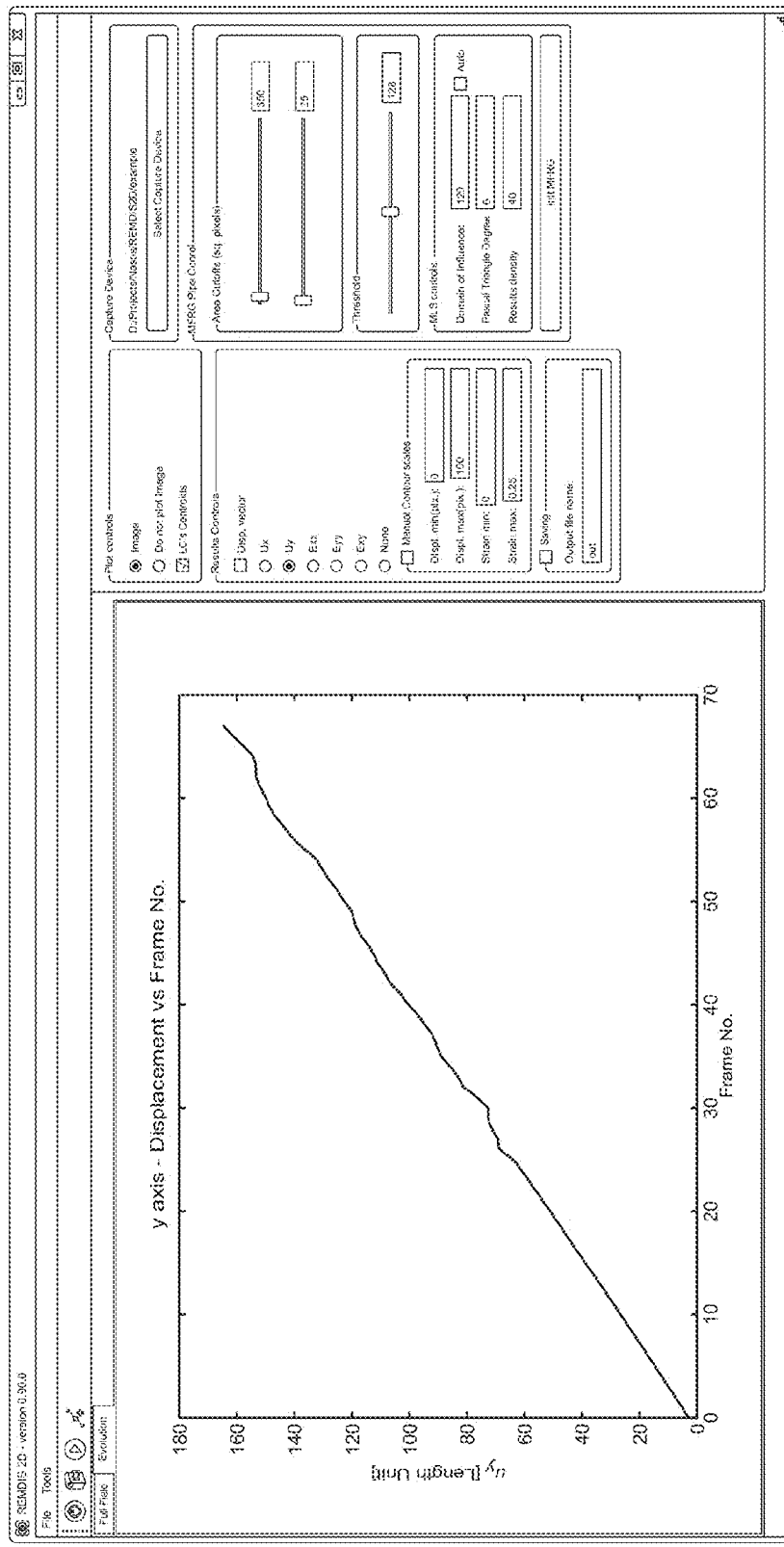

In this example, Region 132 of FIG. 13A shows the GUI screen with an image of the aluminum plate specimen with the dots and the corresponding identified dot centroids. FIG. 13B shows the GUI screen with an image of the specimen with overlaid y-displacement contours in color and dot centroids in red. FIG. 13C shows the GUI screen with the y-strain contours in color and the dot centroids. Note that the shear bands are clearly visible due to the measuring accuracy provided by the software program. FIG. 13D shows the GUI screen with the x-strain contours in color and the dot centroids. FIG. 13E shows the GUI screen with the xy-strain contours in color and the dot centroids. FIG. 13F shows the GUI screen with the y-strain evolution from the midpoint of the specimen plotted as length in the y direction versus frame number from 0 to 70 image frames.

The main menu and the toolbar items enable the following actions: quitting the application; selecting the capturing device with a dialog that allows the user to select the device from which to capture the images (frames) of the experiment; starting and stopping the MFRGM process; choosing region of interest (a region that will be used to monitor the centroids and will remain the same for all images); choosing the internal bounding polygon. The internal bounding polygon is a region that is used to disregard regions such as openings or holes on the specimen. The region shape changes automatically as the specimen deforms.

A full field tab contains the canvas where all the imaging response takes place. The images grabbed as well as the full fields of displacement and strain fields are displayed here. The status bar displays messages to inform the user about the action the application is working on.

Refer again to FIG. 3, which includes steps or modules for user and selection and operation of capture device 31, user selection of criteria for thresholding for the dot identification and application of geometric filters 32, and establishment of mesh free domain radius and Pascal triangle degree 33. The system also allows the user to direct the system to accomplish the following tasks: specify gauges, start field evaluation, and select output radio buttons.

Several control widgets expand the flexibility of MFRGM application through REMDIS-2D. An important widget is the Input tab—Capture Device. The settings of the capturing procedure are chosen in this group. The choice can be accomplished either from the button in this group or from the main menu. The capture device dialog box provides the user the option of capturing the images from a directory (and choosing the directory) as they become available, or capturing images at an interval (and selecting the interval). In the first option, the software monitors the directory folder for new files and acquires them as they become available. This is useful for a real time experiment. The second option uses a folder with saved images and streaming them into REMDIS at predefined intervals, and is useful for processing images off-line. On a Pentium 4 2.4 GHz, with images of 2 megapixel resolution, REMDIS 2D can achieve a working rate of one to two frames per second, with the slowest process been the plotting of the image and the results. The application will acquire the last image at the time the main flow requests for one (in-between images will be disregarded). The camera's acquisition rate can be higher than REMDIS 2D processing loop rate, without that affecting the procedure. In off-line mode REMDIS will read all the images in the folder in alphabetic order and will process them one by one at the intervals the user specifies. The user can store the experiments images in separate folders to avoid conflicts.

Geometric filters: The geometric filters aid in defining regions of interest on the image and boundaries of the specimen. By choosing the appropriate option from the menu, the user can define a polygon on the image. This definition can be accomplished by any of the following methods: By clicking a central (usually roller) button on the mouse, a new vertex is added on the polygon. To finish picking the user must press "Ctrl+center mouse button". By clicking and holding the left mouse button the user can create a continuous polygon. The polygon will be closed when the user releases the left mouse button.

Thesholding and area cutoffs: As the first image becomes available, the user defines the threshold and area cutoffs. This will ensure that the dots located in the proper areas of interest are identified.

Establishment of mesh free domain radius and polynomial degree: The Mesh Free domain radius defines the radius of a circle within which the nodal values will be considered for the field variables approximation. The radius should be approximately 2.1-3 times the mean nodal distance "d". The Pascal Triangle Degree (PTD) defines the order of the Polynomial Degree (PD) approximation (there is a non 1-1 relationship between the PTD and the PD). It is a good practice to keep that degree low, as it will provide the approximation with the least assumptions on the shape of displacement and strain fields.

Specify gauges: The user can choose the "Gauges List" tab on the upper right portion of the main screen and hover the mouse over the region of the spots. By pressing button "p" on the keyboard, the list is populated with gauges been added for each position the mouse hovers over. When the user has finished picking gauge points, the next step is to uncheck the box "Plot Gauges" so that gauges are not plotted during MFRGM run. Graphical area cut-off sliders are provided with adjustable minimum and maximum values and should be chosen so that dots that are not in the region of interest are filtered out of the calculation. In the Moving List Squares (MLS) controls area it is possible to define the MLS domain of support. As a rule of thumb this number must be about 2.1 to 3.0 times the mean distance between the dots. It is also possible to select the polynomial basis (as terms of a Pascal triangle formulation). Good choices are 4, 6, and 7, with higher values resulting to smoother results. For accurate measurements the polynomial basis can be 4 or 6. The results density is the density of the resulting representation of the values of the field function. Higher results density will result in finer contour plots. Selecting a results density value of over about 30 should result in quite satisfactory contours.

Initialization and Termination of MFRGM: MFRGM can be started via either the play button on the toolbar, or by first pressing the "Init MFRG" action (also under the menu Tools) and then the play button. It should take a few seconds for the application to initialize and it will start plotting contours over the surface of the specimen, as the program loads subsequent frames.

To turn off the identified centroids and get a more clear view of the specimen, the LC's centroids checkbox (under plot controls) must be unchecked.

The MFRGM process can be stopped at any time by clicking on the stop button.

Selecting Outputs: The user can make various selections in the "plot controls" group and the "results controls" check boxes to choose the desired measurement components. It is possible to change the item to plot on the fly. By clicking on the incremental "evolution" tab the user can see the plot that represents the evolution of the selected item (for example the displacement on y axis).

There are other options in the software, such as the "Manual Contour Scaling" and "Saving" functions. A backup test directory with example images can be created for the tests. The user may find it convenient to erase the "out" directory between subsequent runs. The region of interest and boundary geometric filters can also be tested, as described above.

An advantage of the system and method described herein is that it does not require application of special photosensitive film or darkroom conditions, as is typically needed for laser-based systems. Another advantage is that the random pattern of dots can be easily and rapidly applied to the specimen, and that image acquisition can be accomplished using only this random pattern of dots and a digital camera. The speed and ease of application compares favorably to some current methods that require accurate application of a coded pattern on the surface of a specimen.

Because the random-grid method described herein does not assume a uniform grid of markers, it can have improved accuracy compared to methods that do assume such precise positioning, such as pure grid methods.

This method and system is intended to provide an automated system for measuring and visualizing deformation vector and strain tensor components over the field of the image of a plane of a deforming body. It can also provide guidance for choosing appropriate image acquisition devices, defining generating and applying distribution patterns of random shaped regions, importing images (frames) from those devices and identifying characteristic points on the images of these individual regions.

Another advantage of the system and method described herein is that it can function as a real-time application through increased performance relative to computational speed. Additional advantages can be realized through use of mesh free approximation techniques, without the need for a step for smoothing the acquired data.

The method can also accept data in real time from external sources, such as from instruments, e.g. sensors, online archives and can provide data to external targets e.g. loading machines, control chipsets or software.

The present system is also adaptable to measure real world displacements, by applying a scaling factor and mapping the image data to a Cartesian grid. The scaling may be done by imaging an object of real dimensions, or by calculating the zoom factor of the lenses in the camera system.

The software system described herein can be implemented as part of a more complex system such as a pose determination and tracking system, or can be implemented as a stand-alone computer based workbench.

The same data can be used in data driven environments that are required to provide decision on real-time. For example, in order to reveal specific material characteristics a loading machine must determine an initially unknown loading path which can be only chosen if deformation data is known in real-time.

Additionally, the present system is adaptable to utilize several forms of software plug-in technology to provide rapid integration of new algorithms or science products such as particle monitoring and velocimetry, kinematic monitoring of fluids, three-dimensional extensions, and integration with position determination and tracking systems.

The system can provide a unique computational implementation that is controlled from a graphical user interface (GUI) and can be configured to accommodate multiple body views, regions, or multiple bodies under deformation.

The GUI front end is also adaptable to provide additional features for the exploitation of full field deformation data, such as contour plots, iso-surfaces plots, 3d surface plots, 2-d and 3-d scatter plots, Line plots over horizontal, vertical, inclined or general lines and curves, history plots, unlimited user chosen gauge locations and/or predetermined gauge locations.

More advantages relate to the robustness of matching clearly identified dots. The process of matching characteristic points is very natural to a human observer but requires an algorithmic implementation that eliminates ambiguous point matching from a machine vision perspective as it is implemented by a computer.

The system can include both a deformable body or test specimen, visually patterned in the manner described above, a test device for deforming the body, the image acquisition system, data storage for storing the images and associated information, communications links for transmitting the images and associated information to the computer system that implements the processing steps (including the point or pattern matching algorithms, and algorithms for calculating and displaying the full field).

The system can be implemented using digital images from a digital camera, a digital video camera, or using digital images from digitization of non-digital images, such as, but not limited to, film cameras. The system can be implemented using digital image frames from digital or film video equipment or other motion picture type cameras.

Portions of the system operate in a computing operating environment, for example, a desktop computer, a laptop computer, a mobile computer, a server computer, and the like, in which embodiments of the invention may be practiced. A brief, general description of a suitable computing environment in which embodiments of the invention may be implemented. While the invention is described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller (not shown) connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible non-transitory medium which can be used to store the desired information and which can be accessed by the computer.

According to one embodiment, the computational workbench for visualizing the full field characteristics of deformable bodies may include a number of program modules.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems. The computer may also include an input/output controller for receiving and processing input from a number of other devices, including a keyboard, mouse, etc. (not shown). Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware,

What is claimed as new and desired to be protected by Letters Patent of the United States is:

1. A computer-implemented method for measuring full field deformation characteristics of a body, the method comprising:
generating a dot pattern for application to the body by a computer processor, said generating including:
determining a position of a first dot,
iteratively determining a position of a next dot with a random number generator having a preset value for mean dot distance, and checking a distance between the next dot and each previous dot to reject the next dot as an overlapping dot if the distance between dots is less than twice the dot radius, and
continuing to determine positions for dots until the dot pattern has a preset minimum number of dots or until a minimum number of iterations has been reached;
applying the dot pattern on a planar side of a deformable body;
acquiring a sequence of images of the dot pattern before and after deformation of the body;
identifying the characteristic points of the dots with a computer processor;
matching the characteristic points between two or more subsequent images;
calculating a displacement vector of the characteristic points; and
calculating full field displacement based on the displacement vector of the characteristic points.

2. The method as in claim 1, wherein the full field displacement is calculated by a mesh free approximation.

3. The method as in claim 1, further comprising:
calculating a full field strain tensor based on the displacement vector of the characteristic points.

4. The method as in claim 3, wherein the full field strain tensor is calculated by a mesh free approximation.

5. The method as in claim 1, wherein said acquiring a sequence of images includes digitally photographing the planar side of the deformable body during deformation.

6. The method as in claim 1, further comprising:
identifying and specifying photographic apparatus for acquiring the images.

7. The method as in claim 1, wherein the characteristic points are centroids, and wherein said identifying the characteristic points of the dots includes light integration of the image to find the centroid of each dot.

8. The method as in claim 1, further comprising:
eliminating irregular objects from the sequence of images by eliminating objects with a dot intensity below a threshold value and eliminating objects with a pixel area outside a predetermined range.

9. The method as in claim 1, further comprising:
eliminating irregular objects from the sequence of images by eliminating objects based on their aspect ratio, moment of inertia, major axes direction, or compactness ratio.

10. The method as in claim 1, further comprising:
displaying a plot of displacement, elongation, or strain versus time or image frames.

11. The method as in claim 1, wherein the dot pattern is applied with mean dot distance of at least 2.1 times the mean dot radius.

12. The method as in claim 1, wherein the dots do not overlap.

13. The method as in claim 1, wherein at least one of the dot size, shape, or spacing is not uniform.

14. A method according to claim 1, wherein said dot pattern consists of non-overlapping dots having a uniform circular shape and each of the dots has a radius of at least three pixels.

15. The method according to claim 1, further comprising:
eliminating irregular objects from the sequence of images by eliminating objects having an area less than a lower area cut-off limit by a computer processor.

16. The method according to claim 1, wherein said further comprising:
eliminating irregular objects from the sequence of images includes by eliminating objects having an area less than a lower area cut-off limit by a computer processor, and eliminating objects having an area greater than an upper area cut-off limit by a computer processor.

17. An apparatus for measuring full field deformation characteristics of a body, comprising: a load tester for deforming a specimen, the specimen having a pattern of optically distinct marks disposed on a planar surface of the specimen; camera for acquiring a sequence of images of the pattern of marks before and after deformation of the specimen; and a computer processor having programmed instructions thereon for identifying the characteristic points of the mark after eliminating non-marker objects from the sequence of images based on a pixel intensity threshold and an area cut-off criterion, matching the characteristic points between two or more subsequent images, calculating a displacement vector of the characteristic points, and calculating full field displacement and strain based on the displacement vector of the characteristic points; and a computer processor having programmed instructions thereon for generating the pattern of optically distinct marks for application to the specimen, said generating including: determining a position of a first mark, iteratively determining a position of a next mark with a random number generator having a preset value for mean mark distance, and checking a distance between the next mark and each previous mark to reject the next mark as an overlapping mark if the distance between marks is less than twice the mark radius, and continuing to determine positions for mark until the pattern has a preset minimum number of marks or until a minimum number of iterations has been reached.

* * * * *

UNITED STATES PATENT AND TRADEMARK OFFICE
CERTIFICATE OF CORRECTION

PATENT NO. : 8,600,147 B2
APPLICATION NO. : 12/793594
DATED : December 3, 2013
INVENTOR(S) : Athanasios Iliopoulos et al.

Page 1 of 1

It is certified that error appears in the above-identified patent and that said Letters Patent is hereby corrected as shown below:

On the title page of the patent, item (75) should be:

Inventors: Athanasios Iliopoulos, Chevy Chase, MD (US);
John G. Michopoulos, Washington, DC (US);
Nikos Andrianopoulos, Athens (GR)

Signed and Sealed this
Seventeenth Day of June, 2014

Michelle K. Lee
*Deputy Director of the United States Patent and Trademark Office*